United States Patent [19]

Hu et al.

[11] Patent Number: 5,597,771

[45] Date of Patent: Jan. 28, 1997

[54] LAYERED CATALYST COMPOSITE

[75] Inventors: Zhicheng Hu, Edison; Chung-Zong Wan, Somerset; Yiu-Kwan Lui, Parlin; Joseph C. Dettling, Howell, all of N.J.

[73] Assignee: Engelhard Corporation, Iselin, N.J.

[21] Appl. No.: 265,076

[22] Filed: Jun. 24, 1994

Related U.S. Application Data

[63] Continuation-in-part of Ser. No. 83,143, Jun. 25, 1993.

[51] Int. Cl.⁶ ............................... B01J 21/04; B01J 23/02
[52] U.S. Cl. .................... 502/304; 502/303; 502/333; 502/334; 502/335; 502/339
[58] Field of Search .............................. 502/303, 304, 502/333, 334, 335, 339

[56] References Cited

U.S. PATENT DOCUMENTS

| | | |
|---|---|---|
| 3,524,721 | 8/1970 | Stephens. |
| 3,545,917 | 12/1970 | Stephens. |
| 3,552,913 | 1/1971 | Stephens. |
| 3,676,370 | 7/1972 | Stephens. |
| 3,787,560 | 1/1974 | Stephens. |
| 3,899,444 | 8/1975 | Stephens. |
| 3,956,188 | 5/1976 | Hindin et al.. |
| 3,993,572 | 11/1976 | Hindin et al.. |
| 4,021,185 | 5/1977 | Hindin et al.. |
| 4,153,579 | 5/1979 | Summers et al. .................... 252/462 |
| 4,157,316 | 6/1979 | Thompson et al.. |
| 4,171,288 | 10/1979 | Keith. |
| 4,189,404 | 2/1980 | Keith et al.. |
| 4,294,726 | 10/1981 | Bozon et al.. |
| 4,367,162 | 1/1983 | Fujitani et al.. |
| 4,438,219 | 3/1984 | Brandenburg et al.. |
| 4,476,246 | 10/1984 | Kim et al.. |
| 4,504,598 | 3/1985 | Ono et al.. |
| 4,539,311 | 9/1985 | Harrison et al.. |
| 4,587,231 | 5/1986 | Sawamura et al.. |
| 4,591,518 | 5/1986 | Schilling et al.. |
| 4,591,578 | 5/1986 | Foley et al.. |
| 4,591,580 | 5/1986 | Kim et al.. |
| 4,624,940 | 11/1986 | Wan et al.. |
| 4,708,946 | 11/1987 | Ohata et al.. |
| 4,714,694 | 12/1987 | Wan et al.. |
| 4,727,052 | 2/1988 | Wan et al.. |
| 4,780,447 | 10/1988 | Kim et al.. |
| 4,806,519 | 2/1989 | Chiba et al.. |
| 4,808,564 | 2/1989 | Matsumoto et al.. |
| 4,923,842 | 5/1990 | Summers. |
| 4,957,710 | 9/1990 | Nagai et al. ...................... 252/462 |
| 4,965,243 | 10/1990 | Yamada et al.. |
| 5,013,705 | 5/1991 | Koberstein et al. ................ 502/262 |
| 5,057,483 | 10/1991 | Wan. |
| 5,075,276 | 12/1991 | Ozawa et al.. |
| 5,254,519 | 10/1993 | Wan et al.. |
| 5,352,646 | 10/1994 | Blanchard et al. ................. 502/304 |
| 5,399,324 | 3/1995 | Subramanian et al. ............. 502/333 |
| 5,411,927 | 5/1995 | Choudhary et al. ............... 502/303 |

FOREIGN PATENT DOCUMENTS

| | | |
|---|---|---|
| 0171151 | 2/1986 | European Pat. Off.. |
| 0313434 | 4/1989 | European Pat. Off.. |
| 0335847 | 10/1989 | European Pat. Off.. |
| 0393612 | 10/1990 | European Pat. Off.. |
| 0427494 | 5/1991 | European Pat. Off.. |
| 0428752 | 5/1991 | European Pat. Off.. |
| 0441173 | 8/1991 | European Pat. Off.. |
| 0507590 | 10/1992 | European Pat. Off.. |
| 9003843 | 4/1990 | WIPO. |
| 9309146 | 5/1993 | WIPO. |

OTHER PUBLICATIONS

Schlatter, et al., "Three Way Catalyst Response To Transients", Ind. Eng. Chem. Prod. Res. Dev., 1980, 19, 288–293.

Kim, "Ceria–Promoted Three–Way Catalysts for Auto Emission Control", Ind. Eng. Chem. Prod. Res. Dev., 1982, 21, 274–288.

*Primary Examiner*—Asok Pal
*Assistant Examiner*—Bekir L. Yildirim
*Attorney, Agent, or Firm*—R. A. Negin

[57] ABSTRACT

The present invention relates to a layered catalyst composite of the type generally referred to as a three-way conversion catalyst having the capability of substantially simultaneously catalyzing the oxidation of hydrocarbons and carbon monoxide and the reduction of nitrogen oxides. The structure of the layered catalyst composite of the present invention is designed wherein there is a first layer and a second layer. The first layer comprises a first support; at least one first palladium component and an oxygen storage component in intimate contact with the palladium component; optionally another first platinum group metal component; a zirconium component; at least one first alkaline earth metal components and at least one first rare earth metal component selected from the group consisting of lanthanum metal components and neodymium metal components. The second layer comprises a second support; at least one second palladium component; optionally another second platinum group metal component; at least one second alkaline earth metal component; at least one second rare earth component selected from the group consisting of lanthanum metal components and neodymium metal components and a zirconium component.

84 Claims, No Drawings

LAYERED CATALYST COMPOSITE

This is a continuation-in-part of copending application Ser. No. 08/083,143 filed on Jun. 25, 1993.

BACKGROUND OF THE INVENTION

1. Field of the Invention

The present invention relates to a layered catalyst composition useful for the treatment of gases to reduce contaminants contained therein. More specifically, the present invention is concerned with improved catalysts of the type generally referred to as "three-way conversion" or "TWC" catalysts. These TWC catalysts are polyfunctional in that they have the capability of substantially simultaneously catalyzing the oxidation of hydrocarbons and carbon monoxide and the reduction of nitrogen oxides.

2. Background of the Invention

Three-way conversion catalysts have utility in a number of fields including the treatment of exhaust from internal combustion engines, such as automobile and other gasoline-fueled engines. Emissions standards for unburned hydrocarbons, carbon monoxide and nitrogen oxides contaminants have been set by various governments and must be met, for example, by new automobiles. In order to meet such standards, catalytic converters containing a TWC catalyst are located in the exhaust gas line of internal combustion engines. The catalysts promote the oxidation by oxygen in the exhaust gas of the unburned hydrocarbons and carbon monoxide and the reduction of nitrogen oxides to nitrogen.

Known TWC catalysts which exhibit good activity and long life comprise one or more platinum group metals (e.g., platinum or palladium, rhodium, ruthenium and iridium) located upon a high surface area, refractory oxide support, e.g., a high surface area alumina coating. The support is carried on a suitable carrier or substrate such as a monolithic carrier comprising a refractory ceramic or metal honeycomb structure, or refractory particles such as spheres or short, extruded segments of a suitable refractory material.

U.S. Pat. No. 3,993,572 discloses catalysts for promoting selective oxidation and reduction reactions. The catalyst contains platinum group metal, rare earth metal and alumina components which may be supported on a relatively inert carrier such as a honeycomb. Useful rare earth metals are disclosed to include ceria.

High surface area alumina materials, also referred to as "gamma alumina" or "activated alumina" typically exhibit a BET surface area in excess of 60 square meters per gram ("$m^2/g$"), often up to about 200 $m^2/g$ or more. Such activated alumina is usually a mixture of the gamma and delta phases of alumina, but may also contain substantial amounts of eta, kappa and theta alumina phases. It is known to utilize refractory metal oxides other than activated alumina as a support for at least some of the catalytic components in a given catalyst. For example, bulk ceria, zirconia, alpha alumina and other materials are known for such use. Although many of these materials suffer from the disadvantage of having a considerably lower BET surface area than activated alumina, that disadvantage tends to be offset by a greater durability of the resulting catalyst.

In a moving vehicle, exhaust gas temperatures can reach 1000° C., and such elevated temperatures cause the activated alumina, or other support material to undergo thermal degradation caused by a phase transition with accompanying volume shrinkage, especially in the presence of steam, whereby the catalytic metal becomes occluded in the shrunken support medium with a loss of exposed catalyst surface area and a corresponding decrease in catalytic activity. It is a known expedient in the art to stabilize alumina supports against such thermal degradation by the use of materials such as zirconia, titania, alkaline earth metal oxides such as baria, calcia or strontia or rare earth metal oxides, such as ceria, lanthana and mixtures of two or more rare earth metal oxides. For example, see C. D. Keith et al U.S. Pat. No. 4,171,288.

Bulk cerium oxide (ceria) is known to provide an excellent refractory oxide support for platinum group metals other than rhodium, and enables the attainment of highly dispersed, small crystallites of platinum on the ceria particles, and that the bulk ceria may be stabilized by impregnation with a solution of an aluminum compound, followed by calcination. U.S. Pat. No. 4,714,694 of C. Z. Wan et al, discloses aluminum-stabilized bulk ceria, optionally combined with an activated alumina, to serve as a refractory oxide support for platinum group metal components impregnated thereon. The use of bulk ceria as a catalyst support for platinum group metal catalysts other than rhodium, is also disclosed in U.S. Pat. No. 4,727,052 of C. Z. Wan et al and in U.S. Pat. No. 4,708,946 of Ohata et al.

U.S. Pat. No. 4,714,694 discloses alumina stabilized ceria catalyst compositions. There is disclosed a method of making a material which includes impregnating bulk ceria or a bulk ceria precursor with an aluminum compound and calcining the impregnated ceria to provide an aluminum stabilized ceria. The composition further comprises one or more platinum group catalytic components dispersed thereon.

U.S. Pat. No. 4,808,564 discloses a catalyst for the purification of exhaust gases having improved durability which comprises a support substrate, a catalyst carrier layer formed on the support substrate and catalyst ingredients carried on the catalyst carrier layer. The catalyst carrier layer comprises oxides of lanthanum and cerium in which the molar fraction of lanthanum atoms to total rare earth atoms is 0.05 to 0.20 and the ratio of the number of the total rare earth atoms to the number of aluminum atoms is 0.05 to 0.25.

U.S. Pat. No. 4,367,162 discloses a three-way catalyst system which comprises a carrier having a substructure of refractory material in the form of a honeycomb structure and a porous layer of a powder formed on the surface thereof selected from the group consisting of a powder of zirconium oxide and a mixed powder of zirconium oxide powder with at least powder selected from the group consisting of alumina, alumina-magnesia spinel and cerium oxide; and a catalyst ingredient supported thereon consisting of cerium oxide and a metal selected from the group consisting of platinum, palladium and mixtures thereof.

U.S. Pat. No. 4,438,219 discloses an alumina catalyst for use on a substrate. The catalyst is stable at high temperatures. The stabilizing material is disclosed to be one of several compounds including those derived from barium, silicon, rare earth metals, alkali and alkaline earth metals, boron, thorium, hafnium and zirconium. Of the stabilizing materials barium oxide, silicon dioxide and rare earth oxides which include lanthanum, cerium, praseodymium, neodymium, and others are indicated to be preferred. It is disclosed that contacting them with a calcined alumina film permits the calcined alumina film to retain a high surface area at higher temperatures.

U.S. Pat. Nos. 4,476,246, 4,591,578 and 4,591,580 disclose three-way catalyst compositions comprising alumina, ceria, an alkali metal oxide promoter and noble metals. U.S. Pat. Nos. 3,993,572 and 4,157,316 represent attempts to improve the catalyst efficiency of Pt/Rh based TWC systems by incorporating a variety of metal oxides, e.g., rare earth metal oxides such as ceria and base metal oxides such as nickel oxides. U.S. Pat. No. 4,591,518 discloses a catalyst comprising an alumina support with components deposited thereon consisting essentially of a lanthana component, ceria, an alkali metal oxide and a platinum group metal. U.S. Pat. No. 4,591,580 discloses an alumina supported platinum group metal catalyst. The support is sequentially modified to include support stabilization by lanthana or lanthana rich rare earth oxides, double promotion by ceria and alkali metal oxides and optionally nickel oxide.

Palladium containing catalyst compositions e.g. U.S. Pat. No. 4,624,940 have been found useful for high temperature applications. The combination of lanthanum and barium is found to provide a superior hydrothermal stabilization of alumina which supports the catalytic component, palladium. Thus, the palladium metal expulsion from the alumina due to phase transformation to encounter drastic sintering upon high temperature exposure is avoided. The use of particulate bulk metal oxide enhances catalytic activities. The bulk metal oxide consists of primarily ceria containing and/or ceria-zirconia containing particles. These particulate bulk metal oxides do not readily react with the stabilized alumina particles, thus, provide the catalytically promoting effect.

U.S. Pat. No. 4,780,447 discloses a catalyst which is capable of controlling HC, CO and $NO_x$ as well as $H_2S$ in emissions from the tailpipe of catalytic converter equipped automobiles. The use of the oxides of nickel and/or iron is known as a $H_2S$ gettering of compound.

In an article entitled "Three Way Catalyst Response To Transients" in *Ind. Eng. Chem. Prod. Res. Dev.*, 1980, 19, 288–293 the authors, Schlatter et al report that the operating environment of three-way catalysts is characterized by oscillations of the feed stream composition which occur with a frequency in the order of 1 Hz. It has been suggested that the incorporation of an "oxygen storage" component in the catalyst moderates the effects of the rapid changes between rich and lean exhaust stoichiometries. The authors also suggest that the presence of cerium on the rhodium-impregnated spheres in a "fresh" three-way catalyst enhances the performance of the catalyst under transient or oscillating feed stream conditions by increasing either the amount or the stability of the oxidized rhodium species. In a later article, published in the same journal, entitled "Ceria-Promoted Three-Way Catalysts for Auto Emission Control" *Ind. Eng. Chem. Prod. Res. Dev.*, 1982, 21, 274–288, the author, Kim reports that ceria is the best non-noble metal oxide promoter for a typical Pt-palladium-Rh TWC supported on alumina catalyst largely because it enhances the water-gas shift reaction ($CO+H_2O=CO_2+H_2$) and possibly due, in part, to the additional oxygen storage it provides to the TWC.

U.S. Pat. No. 4,539,311 discloses a catalyst for treating motor vehicle exhaust fumes which catalyst is said to have an improved tolerance for lead. A high surface area alumina is impregnated first with a barium moiety, such as an aqueous solution of a barium compound which decomposes to produce barium oxide on firing at over 400° C., and, after such firing, is subsequently impregnated with a dispersion of a platinum group metal moiety such as by soaking the alumina in an aqueous solution of a metal compound which on firing at over 400° C. decomposes to leave behind either the platinum group metal or a compound which converts to the metal when the catalyst is placed in use. The catalyst is made by coating a honeycomb support with alumina incorporating ceria. The dried and calcined alumina coating is then soaked in an aqueous solution of barium nitrate, dried and fired and then soaked in an aqueous solution of chloroplatinic acid, dried and fired. The firing steps are carried out at 550° C.

U.S. Pat. No. 4,294,726 discloses a TWC catalyst composition containing platinum and rhodium obtained by impregnating a gamma alumina carrier material with an aqueous solution of cerium, zirconium and iron salts or mixing the alumina with oxides of, respectively, cerium, zirconium and iron, and then calcining the material at 500° to 700° C. in air after which the material is impregnated with an aqueous solution of a salt of platinum and a salt of rhodium dried and subsequently treated in a hydrogen-containing gas at a temperature of 250°–650° C. The alumina may be thermally stabilized with calcium, strontium, magnesium or barium compounds. The ceria-zirconia-iron oxide treatment is followed by impregnating the treated carrier material with aqueous salts of platinum and rhodium and then calcining the impregnated material.

U.S Pat. No. 4,965,243 discloses a method to improve thermal stability of a TWC catalyst containing precious metals by incorporating a barium compound and a zirconium compound together with ceria and alumina. This is stated to form a catalytic moiety to enhance stability of the alumina washcoat upon exposure to high temperature.

J01210032 and AU-615721 disclose a catalytic composition comprising palladium, rhodium, active alumina, a cerium compound, a strontium compound and a zirconium compound. These patents suggests the utility of alkaline earth metals in combination with ceria, zirconia to form a thermally stable alumina supported palladium containing washcoat.

U.S. Pat. Nos. 4,624,940 and 5,057,483 refer to ceria-zirconia containing particles. It is found that ceria can be dispersed homogeneously throughout the zirconia matrix up to 30 weight percent of the total weight of the ceria-zirconia composite to form a solid solution. A co-formed (e.g. co-precipitated) ceria oxide-zirconia particulate composite can enhance the ceria utility in particles containing ceria-zirconia mixture. The ceria provides the zirconia stabilization and also acts as an oxygen storage component. The '483 patent discloses that neodymium and/or yttrium can be added to the ceria-zirconia composite to modify the resultant oxide properties as desired.

U.S. Pat. No. 4,504,598 discloses a process for producing a high temperature resistant TWC catalyst. The process includes forming an aqueous slurry of particles of gamma or activated alumina and impregnating the alumina with soluble salts of selected metals including cerium, zirconium, at least one of iron and nickel and at least one of platinum, palladium and rhodium and, optionally, at least one of neodymium, lanthanum, and praseodymium. The impregnated alumina is calcined at 600° C. and then dispersed in water to prepare a slurry which is coated on a honeycomb carrier and dried to obtain a finished catalyst.

U.S. Pat. Nos. 3,787,560, 3,676,370, 3,552,913, 3,545, 917, 3,524,721 and 3,899,444 all disclose the use of neodymium oxide for use in reducing nitric oxide in exhaust gases of internal combustion engines. U.S. Pat. No. 3,899,444 in particular discloses that rare earth metals of the lanthanide series are useful with alumina to form an activated stabilized catalyst support when calcined at elevated temperatures. Such rare earth metals are disclosed to include lanthanum, ceria, cerium, praseodymium, neodymium and others.

TWC catalyst systems comprising a carrier and two or more layers of refractory oxide are disclosed.

For example, Japanese Patent Publication No. 145381/1975 discloses a catalyst-supported structure for purifying exhaust gases comprising a thermally insulating ceramic carrier and at least two layers of catalyst containing alumina or zirconia, the catalysts in the catalyst containing alumina or zirconia layers being different from each other.

Japanese Patent Publication No. 105240/1982 discloses a catalyst for purifying exhaust gases containing at least two kinds of platinum-group metals. The catalyst comprising at least two carrier layers of a refractory metal oxide each containing a different platinum-group metal. There is a layer of a refractory metal oxide free from the platinum-group metal between the carrier layers and/or on the outside of these carrier layers.

Japanese Patent Publication No. 52530/1984 discloses a catalyst having a first porous carrier layer composed of an inorganic substrate and a heat-resistant noble metal-type catalyst deposited on the surface of the substrate and a second heat-resistant non-porous granular carrier layer having deposited thereon a noble metal-type catalyst, said second carrier layer being formed on the surface of the first carrier layer and having resistance to the catalyst poison.

Japanese Patent Publication No. 127649/1984 discloses a catalyst for purifying exhaust gases, comprising an inorganic carrier substrate such as cordierite, an alumina layer formed on the surface of the substrate and having deposited thereon at least one rare earth metal such as lanthanum and cerium and at least one of platinum and palladium, and a second layer formed on the aforesaid first alumina-based layer and having deposited thereon a base metal such as iron or nickel, at least one rare earth metal such as lanthanum, and rhodium.

Japanese Patent Publication No. 19036/1985 discloses a catalyst for purifying exhaust gases having an enhanced ability to remove carbon monoxide at low temperatures, said catalyst comprising a substrate composed, for example, of cordierite and two layers of active alumina laminated to the surface of the substrate, the lower alumina layer containing platinum or vanadium deposited thereon, and the upper alumina layer containing rhodium and platinum, or rhodium and palladium, deposited thereon.

Japanese Patent Publication No. 31828/1985 discloses a catalyst for purifying exhaust gases, comprising a honeycomb carrier and a noble metal having a catalytic action for purifying exhaust gases, the carrier being covered with an inside and an outside alumina layer, the inside layer having more noble metal adsorbed thereon than the outside layer; and a process for production of this catalyst.

Japanese Patent Publication No. 232253/1985 discloses a monolithic catalyst for purifying exhaust gases being in the shape of a pillar and comprising a number of cells disposed from an exhaust gas inlet side toward an exhaust gas outlet side. An alumina layer is formed on the inner wall surface of each of the cells, and catalyst ingredients are deposited on the alumina layer. The alumina layer consists of a first alumina layer on the inside and a second alumina layer on the surface side, the first alumina layer having palladium and neodymium deposited thereon, and the second alumina layer having platinum and rhodium deposited thereon.

Japanese Kokai 71538/87 discloses a catalyst layer supported on a catalyst carrier and containing one catalyst component selected from the group consisting of platinum, palladium and rhodium. An alumina coat layer is provided on the catalyst layer. The coat layer contains one oxide selected from the group consisting of cerium oxide, nickel oxide, molybdenum oxide, iron oxide and at least one oxide of lanthanum and neodymium (1–10% by wt.).

U.S. Pat. Nos. 3,956,188 and 4,021,185 disclose a catalyst composition having (a) a catalytically active, calcined composite of alumina, a rare earth metal oxide and a metal oxide selected from the group consisting of an oxide of chromium, tungsten, a group IVB metal and mixtures thereof and (b) a catalytically effective amount of a platinum group metal added thereto after calcination of said composite. The rare earth metals include cerium, lanthanum and neodymium.

U.S. Pat. No. 4,806,519, discloses a two layer catalyst structure having alumina, ceria and platinum on the inner layer and aluminum, zirconium and rhodium on the outer layer.

JP-88-240947 discloses a catalyst composite which includes an alumina layer containing ceria, ceria-doped alumina and at least one component selected from the group of platinum, palladium and rhodium. There is a second layer containing lanthanum-doped alumina, praseodymium-stabilized zirconium, and lanthanum oxide and at least one component selected from the group of palladium and rhodium. The two layers are placed on a catalyst carrier separately to form a catalyst for exhaust gas purification.

Japanese Patent J-63-205141-A discloses a layered automotive catalyst in which the bottom layer comprises platinum or platinum and rhodium dispersed on an alumina support containing rare earth oxides, and a top coat which comprises palladium and rhodium dispersed on a support comprising alumina, zirconia and rare earth oxides.

Japanese Patent J-63-077544-A discloses a layered automotive catalyst having a first layer comprising palladium dispersed on a support comprising alumina, lanthana and other rare earth oxides and a second coat comprising rhodium dispersed on a support comprising alumina, zirconia, lanthana and rare earth oxides.

Japanese Patent J-63-007895-A discloses an exhaust gas catalyst comprising two catalytic components, one comprising platinum dispersed on a refractory inorganic oxide support and a second comprising palladium and rhodium dispersed on a refractory inorganic oxide support.

U.S. Pat. No. 4,587,231 discloses a method of producing a monolithic three-way catalyst for the purification of exhaust gases. First, a mixed oxide coating is provided to a monolithic carrier by treating the carrier with a coating slip in which an active alumina powder containing cerium oxide is dispersed together with a ceria powder and then baking the treated carrier. Next platinum, rhodium and/or palladium are deposited on the oxide coating by a thermal decomposition. Optionally, a zirconia powder may be added to the coating slip.

U.S. Pat. No. 4,134,860 relates to the manufacture of catalyst structures. The catalyst composition can contain platinum group metals, base metals, rare earth metals and refractory, such as alumina support. The composition can be deposited on a relatively inert carrier such as a honeycomb.

U.S. Pat. No. 4,923,842 discloses a catalytic composition for treating exhaust gases comprising a first support having dispersed thereon at least one oxygen storage component and at least one noble metal component, and having dispersed immediately thereon an overlayer comprising lanthanum oxide and optionally a second support. The layer of catalyst is separate from the lanthanum oxide. The nobel metal can include platinum, palladium, rhodium, ruthenium and iridium. The oxygen storage component can include the oxide of a metal from the group consisting of iron, nickel, cobalt and the rare earths. Illustrative of these are cerium, lanthanum, neodymium, praseodymium, etc.

U.S. Pat. No. 5,057,483 discloses a catalyst composition suitable for three-way conversion of internal combustion engine, e.g., automobile gasoline engine, exhaust gases includes a catalytic material disposed in two discrete coats on a carrier. The first coat includes a stabilized alumina support on which a first platinum catalytic component is dispersed and bulk ceria, and may also include bulk iron oxide, a metal oxide (such as bulk nickel oxide) which is effective for the suppression of hydrogen sulfide emissions, and one or both of baria and zirconia dispersed throughout the first coat as a thermal stabilizer. The second coat, which may comprise a top coat overlying the first coat, contains a co-formed (e.g., co-precipitated) rare earth oxide-zirconia support on which a first rhodium catalytic component is dispersed, and a second activated alumina support having a second platinum catalytic component dispersed thereon. The second coat may also include a second rhodium catalytic component, and optionally, a third platinum catalytic component, dispersed as an activated alumina support.

It is a continuing goal to develop a three-way catalyst system which is inexpensive and stable. At the same time the system should have the ability to oxidize hydrocarbons and carbon monoxide while reducing nitrogen oxides to nitrogen.

SUMMARY OF THE INVENTION

The present invention relates to a thermally stable, up to 900° C. or more, layered catalyst composite of the type generally referred to as a three-way conversion catalyst or TWC catalyst. These TWC catalysts are polyfunctional in that they have the capability of substantially simultaneously catalyzing the oxidation of hydrocarbons and carbon monoxide and the reduction of nitrogen oxides. The relative layers of the catalyst composite and the specific composition of such layer provide a stable, economical system. This enables the maintenance of effective oxidation of hydrocarbons and carbon monoxide as well as enhanced conversion of nitrogen oxide compounds even where palladium is the only platinum metal group component in the composite.

The structure of the layered catalyst composite of the present invention is designed wherein there is a first layer having a first layer composition and a second layer having a second layer composition. The first layer is also referred to as the bottom or inner layer and the second layer referred to as the top or outer layer. Exhaust gaseous emissions comprising hydrocarbons, carbon monoxide and nitrogen oxides first encounter the second or top layer. In the top layer, the platinum group metal acts to catalyze the reduction of nitrogen oxides to nitrogen and the oxidation of hydrocarbons. The top layer can comprise an oxygen storage component such as ceria. However, it is essential that the ceria is not in intimate contact with the platinum group metal in the top layer. This can be accomplished by making the top layer with a ceria-zirconia composite and not a solution of a soluble ceria salt. The composite oxygen storage composition is in bulk form. By bulk form it is meant that a composition is in a solid, preferably fine particulate form, more preferably having a particle size distribution such that at least about 95% by weight of the particles typically have a diameter of from 0.1 to 5.0, and preferably from 0.5 to 3 micrometers. Reference to the discussion of bulk particles is made to U.S. Pat. No. 5,057,483 both hereby incorporated by reference.

Upon passing through the top or second layer, the exhaust gas then contacts the first or bottom layer. In this layer, the platinum group metal is in intimate contact with an oxygen storage component, such as ceria. This can be accomplished by introducing the cerium component into the bottom layer composition in the form of a solution of soluble cerium salt which impregnates the support and other particulate materials. The cerium salt is converted to cerium oxide (ceria) upon calcining. The ceria in intimate contact with the platinum group metal is believed to enhance oxidation and reduction reaction. By intimate contact it is meant that an effective amount of the components in such contact (e.g., the platinum group metal component and oxygen storage component in the bottom layer) are on the same support and/or are in direct contact. By non-intimate contact (or being physically separate) the component (e.g., ceria and platinum group component in the top layer) are not on the same support or are not comprised in the same particles.

The present invention comprises a layered catalyst composite comprising a first layer and a second layer. The first layer comprises a first support. The first layer comprises a first palladium component and optionally, at least one first platinum group metal component other than palladium, an oxygen storage component in intimate contact with the platinum group metal component in the first layer. Preferably the first layer additionally comprises a first zirconium component, at least one first alkaline earth metal component, and at least one first rare earth metal component selected from the group consisting of lanthanum metal components and neodymium metal components. The second layer comprises a second palladium component and optionally, at least one second platinum group metal component other than palladium. Preferably the second layer additionally comprises a second zirconium component, at least one second alkakine earth metal component, and at least one second rare earth metal component selected from the group consisting of lanthanum metal components and neodymium metal components. Preferably, each layer contains a zirconium component, at least one of the alkaline earth metal components and the rare earth component. Most preferably, each layer includes both at least one alkaline earth metal component and at least one rare earth component. The first layer optionally further comprises a second oxygen storage composition which comprises a second oxygen storage component. The second oxygen storage component and/or the second oxygen storage composition are preferably in bulk form and also in intimate contact with the first platinum group metal component.

In a specific and preferred embodiment of the present invention. The first platinum group metal consists essentially of a first palladium component which is substantially the only platinum group metal component in the first layer. In this preferred embodiment the second platinum group metal component consists essentially of a second palladium component wherein the second palladium component is substantially the only platinum group metal component in the second layer.

Optionally, the first and/or the second layers comprise an oxygen storage composite in particulate form. The oxygen storage composite preferably comprises ceria and zirconia and optionally and yet more preferably a rare earth component selected from the group consisting of lanthanum and neodymium components and mixtures thereof. A particularly preferred composite comprises ceria, neodymia, and zirconia. Preferably there is from 60 to 90 weight percent zirconia, 10 to 30 weight percent ceria, and up to 10 weight percent neodymia. The ceria in the composite not only behaves as an oxygen storage component enhancing oxidation of carbon monoxide and the reduction of nitric oxides but also helps to stabilize the zirconia by preventing it from undergoing undesirable phase transformation. As indicated above, the specific and preferred composition of the present invention is one wherein the first and second layers require respectively a first palladium component and a second palladium component. Optionally the first layer can further comprise at least one additional platinum group metal component which preferably selected from the group consisting of platinum, rhodium, ruthenium, and iridium components with preferred additional first layer platinum group metal components being selected from the group consisting of platinum and rhodium and mixtures thereof.

Similarly the second layer can further comprise, in addition to a second palladium component, at least one second platinum group metal component, preferably selected from the group consisting of platinum, rhodium, ruthenium, and iridium components, with platinum and rhodium components being preferred.

As indicated, according to the present invention the first layer comprises a first oxygen storage component which is in intimate contact with the first platinum group metal which comprises palladium and preferably consists substantially only of palladium. Additionally there can be a first bulk oxygen storage component such as bulk ceria, bulk praseodymia, and/or an oxygen storage composite such as a ceria zirconia particulate composite.

The second layer comprises a second platinum group metal component which comprises palladium and most preferably consists essentially of palladium. In the second layer the oxygen storage component if present is not in intimate contact with the platinum group metal component and preferably includes a bulk second oxygen storage composite which can comprise a composite of ceria, zirconia, and optionally and preferably a rare earth metal oxide such as neodymia or lanthana.

In a specific and preferred embodiment the first layer comprises a first support; at least one first platinum group metal component comprising a first palladium component dispersed on the first support; and an oxygen storage component, preferably ceria, in intimate contact with the platinum group metal component; at least one alkaline earth metal component, at least one zirconium component and at least one first rare earth metal component selected from the group consisting of lanthanum metal components and neodymium metal components.

The second layer comprises a second support which can be the same or different than the first support; at least one second platinum group metal dispersed on the second support comprising a second palladium component; at least one second alkaline earth metal components which can be the same or different than the first alkaline earth metal component; at least one second zirconium component; and at least one second rare earth metal component selected from the group consisting of lanthanum metal components and neodymium metal components which can be different from that of the first rare earth metal component.

Preferred first and second supports can be the same or different compounds selected from the group consisting of silica, alumina, and titania compounds. More preferably the first and second supports are activated compounds selected from the group consisting of alumina, silica, silica-alumina, alumino-silicates, alumina-zirconia, alumina-chromia, and alumina-ceria. First and second supports are most preferably activated alumina.

Alkaline earth metals are believed to stabilize the first and second layer compositions, and rare earth metal components selected from lanthanum and neodymium components are believed to promote the catalytic activity of the first and second layer compositions. Zirconium component in both layers act as both washcoat stabilizer and promoter.

The specific construction of layers having the first and second compositions has been found to result in an effective three-way catalyst even when used with palladium as the sole platinum group metal in each layer. The composite can be in the form of a self-supported article such as a pellet with the first layer on the inside and the second layer on the outside of the pellet. Alternatively, and more preferably, the first layer is supported on a carrier, also referred to as a substrate, preferably a honeycomb substrate, and the second layer is supported on the first layer applied to the substrate.

The at least one first and at least one second alkaline earth metal can be selected from the group consisting of magnesium, barium, calcium and strontium, preferably strontium and barium. Most preferably, the first alkaline earth metal component comprises barium oxide and the second alkaline earth metal component comprises strontium oxide. Stabilization means that the conversion efficiency of the catalyst composition of each layer is maintained for longer period of time at elevated temperatures. Stabilized supports such as alumina and catalytic components such as noble metals are more resistant to degradation against high temperature exposure thereby maintaining better overall conversion efficiencies.

The first layer composition and second layer composition further respectively and preferably comprise first and second rare earth metal components which are believed to act as promoters. The rare earth metal components are derived from a metal selected from the group consisting of lanthanum and neodymium. In a specific embodiment, the first rare earth metal component is substantially lanthana and the second rare earth component is substantially neodymia. The promoter enhances the conversion of the hydrocarbons, carbon monoxide and nitrogen oxides to harmless compounds.

In specific and preferred embodiments the first and/or second layers further comprise nickel or iron components useful to remove sulfides such as hydrogen sulfides emissions. Most preferably, the first layer comprises a nickel or iron compound.

When the compositions are applied as a thin coating to a monolithic carrier substrate, the proportions of ingredients are conventionally expressed as grams of material per cubic inch of the catalyst and the substrate. This measure accommodates different gas flow passage cell sizes in different monolithic carrier substrates. Platinum group metal components are based on the weight of the platinum group metal.

A useful and preferred first layer has:

from about 0.003 to about 0.6 $g/in^3$ of at least one palladium component;

from 0 to about 0.065 $g/in^3$ of at least one first platinum and/or first rhodium component;

from about 0.15 to about 2.0 $g/in^3$ of a first support;

from about 0.05 to about 2.0 $g/in^3$ of the total of the first oxygen storage components in the first layer;

from 0.0 and preferably about 0.025 to about 0.5 $g/in^3$ of at least one first alkaline earth metal component;

from 0.0 and preferably about 0.025 to about 0.5 $g/in^3$ of a first zirconium component; and from 0.0 and preferably about 0.025 to about 0.5 $g/in^3$ of at least one first rare earth metal component selected from the group consisting of ceria metal components, lanthanum metal components and neodymium metal component.

A useful and preferred second layer has:

from about 0.003 g/in$^3$ to about 0.6 g/in$^3$ of at least one second palladium component;

from 0.0 g/in$^3$ to about 0.065 g/in$^3$ of at least one first platinum and/or rhodium component;

from about 0.15 g/in$^3$ to about 2.0 g/in$^3$ of a second support;

from 0.0 and preferably about 0.025 g/in$^3$ to about 0.5 g/in$^3$ of at least one second rare earth metal component selected from the group consisting of lanthanum metal components and neodymium metal components;

from 0.0 and preferably about 0.25 g/in$^3$ to about 0.5 g/in$^3$ of at least one second alkaline earth metal component; and from 0.0 and preferably about 0.025 to about 0.5 g/in$^3$ of a second zirconium component. However, the first layer requires an alkaline earth metal component and/or a rare earth component, and the second layer requires an alkaline earth metal component and/or a rare earth metal component.

The first and/or second layer can have from 0.0 to about 2.0 g/in$^3$ of an oxygen storage composite comprising particulate form of cera-zirconia composite.

The layered catalyst composite can be in the form of a self-supported article such as a pellet with the first layer on the inside and the second layer on the outside of the pellet. Alternatively, and more preferably, the first layer can be supported on a substrate, preferably a honeycomb carrier, and the second layer is supported on the first layer applied on the substrate.

The present invention includes a method comprising the steps of treating a gas comprising nitrogen oxide, carbon monoxide and/or hydrocarbon by contacting the gas with a layered catalyst composite as recited above.

The present invention also includes a method of preparation of the layered catalyst composite of the present invention.

DETAILED DESCRIPTION OF THE PREFERRED EMBODIMENTS

The present invention is directed to a layered catalyst composite of the type useful as a three-way conversion catalyst or a TWC. The TWC catalyst composite of the present invention simultaneously catalyzes the oxidation of hydrocarbons and carbon monoxide and the reduction of nitrogen oxides in a gas stream.

The layered catalyst composite comprises a first layer comprising a first layer composition and the second layer comprising a second layer composition. As recited above, the gas stream initially encounters the second, top or outer layer composition which is designed to effectively reduce nitrogen oxides to nitrogen and oxidize hydrocarbons while causing some oxidation of carbon monoxide. The gas then passes to the first layer to convert the rest of the pollutants.

The specific design of the top or second layer results in effective reduction of nitrogen oxides and oxidation of hydrocarbons over wide temperature ranges. In the composite of the present invention, palladium, an economical platinum group metal, can be more effectively used by itself in such application. The performance of this material is further enhanced by the use of an alkaline earth metal which is believed to act as a stabilizer, a rare earth metal component selected from lanthanum and neodymium which is believed to act as a promoter, and a zirconium component.

In the first or bottom layer, a first oxygen storage component is desired to be in intimate contact with the platinum group metal. In this first layer, oxidation and reduction reactions are efficient at temperatures above about 500° C.

The first layer comprises a first platinum group metal component, which comprises a first palladium component, which can be the same or different than that in the second layer. For the first layer to result in higher temperature conversion efficiencies, an oxygen storage component is used in intimate contact with the platinum group metal. Here again, it is preferred to use an alkaline earth metal component believed to act as a stabilizer, a rare earth metal selected from lanthanum and neodymium metal components which is believed to act as a promoter, and a zirconium component.

The catalyst of this invention comprises a palladium component present in each of the first and second layers, in the catalytically-active, promoting component in an amount sufficient to provide compositions having significantly enhanced catalytic activity due to the palladium component. In a preferred embodiment the first palladium component is the only platinum group metal component in the first layer, and the second palladium component is the only platinum group metal component in the second layer. Optionally either or both of the first and second layers can further respectively comprise a first and second useful platinum group metals include, for instance, platinum, ruthenium, iridium and rhodium, and mixtures or alloys of such metals, e.g., platinum-rhodium.

In a preferred embodiment the first layer can comprise a first palladium component and relatively minor amounts of a first platinum group metal other than palladium and/or the second layer can comprise a second palladium component and relatively minor amounts of a second platinum group metal component other than a palladium component. The preferred first and second platinum group components are selected from platinum, rhodium, and mixtures thereof. The preferred first platinum group metal component other than palladium is platinum and the most preferred second platinum group metal component other than palladium is selected from rhodium, platinum, and mixtures thereof. Typically the first layer will contain up to 100 percent by weight of palladium as the platinum group metal. Where a first platinum group metal component other than palladium is used, it is used typically in amounts up to 40 and preferably from 0.1 to 40, more preferably from 5 to 25 percent by weight based on the total weight of the first palladium component and the platinum group metal components other than palladium in the first layer. Where a second platinum group metal component other palladium is used, it is used typically in amounts up to 40 and preferably from 0.1 to 40, more preferably from 5 to 25 percent by weight based on the total weight of the second palladium component and the platinum group metal components other than palladium in the second layer.

Thus, the present system comprising at least two layers wherein palladium is believed to principally act as a catalyst to enhance the lower temperature activity (reactions) in the second (top) layer, and the higher temperature activities (reactions) in the first (bottom) layer compared to the top layer. The top layer is therefore preferably designed to be reactive at temperatures below about 500° C., while the bottom layer is designed to be more reactive at temperatures above about 500° C. However, it is recognized that specific temperatures at which the layers are reactive and percent conversion depend on the specific exhaust gas environment including, for example, space velocity.

The first layer composition and second layer composition respectively comprise a first support and a second support which can be the same or different components. The support is made of a high surface area refractory oxide support. Useful high surface area supports include one or more refractory oxides. These oxides include, for example, silica and metal oxides such as alumina, including mixed oxide forms such as silica-alumina, aluminosilicates which may be amorphous or crystalline, alumina-zirconia, alumina-chromia, alumina-ceria and the like. The support is substantially comprised of alumina which preferably includes the members of the gamma or activated alumina family, such as gamma and eta aluminas, and, if present, a minor amount of other refractory oxide, e.g., about up to 20 weight percent. Desirably, the active alumina has a specific surface area of 60 to 300 $m^2/g$.

The first layer and second layer compositions comprise alumina, catalytic components, stabilizers, reaction promoters and, if present, other modifiers and excludes the carrier or substrate. When the compositions are applied as a thin coating to a monolithic carrier substrate, the proportions of ingredients are conventionally expressed as grams of material per cubic inch of catalyst as this measure accommodates different gas flow passage cell sizes in different monolithic carrier substrates. For typical automotive exhaust gas catalytic converters, the catalyst composite which includes a monolithic substrate generally may comprise from about 0.50 to about 6.0, preferably about 1.0 to about 5.0 $g/in^3$ of catalytic composition coating.

In a preferred method of preparing the catalyst, a palladium and optionally a platinum group metal component other than palladium such as a suitable compound and/or complex of the palladium and platinum group metals may be utilized to achieve dispersion of the catalytic component on activated alumina support particles. As used herein, the term "palladium and optional platinum group metal component" means any palladium and optional platinum metal compound, complex, or the like which, upon calcination or use of the catalyst decomposes or otherwise converts to a catalytically active form, usually, the metal or the metal oxide. Water soluble compounds or water dispersible compounds or complexes of palladium may be utilized as long as the liquid used to impregnate or deposit the catalytic metal compounds onto alumina support particles does not adversely react with the catalytic metal or its compound or complex or the other components of the catalyst composition and is capable of being removed from the catalyst by volatilization or decomposition upon heating and/or the application of vacuum. In some cases, the completion of removal of the liquid may not take place until the catalyst is placed into use and subjected to the high temperatures encountered during operation. Generally, both from the point of view of economics and environmental aspects, aqueous solutions of soluble compounds or complexes of the palladium and optional platinum group metals are preferred. For example, suitable compounds are chloroplatinic acid, amine solubilized platinum hydroxide, palladium nitrate or palladium chloride, rhodium chloride, rhodium nitrate, hexamine rhodium chloride, etc. During the calcination step, or at least during the initial phase of use of the catalyst, such compounds are converted into a catalytically active form of the platinum group metal or a compound thereof.

The catalyst of the present invention can contain a first oxygen storage component in the first or bottom layer which is in intimate contact with the palladium component. The oxygen storage component is any such material known in the art and preferably at least one oxide of a metal selected from the group consisting of rare earth metals and most preferably a cerium or praseodymium compound with the most preferred oxygen storage component being cerium oxide (ceria). The oxygen storage component can be present at least 5 wt. % and preferably at least 10 wt. % and more preferably at least 15 wt. % of the first layer composition.

In the composition of the first or bottom layer, the oxygen storage component can be included by dispersing methods known in the art. Such methods can include impregnation onto the first composition by impregnating the oxygen storage component onto the palladium containing support in the form of an aqueous solution, drying and calcining the resulted mixture in air to give a first layer which contains an oxide of the oxygen storage component in intimate contact with the palladium component. Typically, impregnation means that there is substantially sufficient liquid to fill the pores of the material being impregnated. Examples of water soluble or dispersible, decomposable oxygen storage components which can be used include, but are not limited to water soluble salts and/or colloidal dispersions of, cerium acetate, praseodymium acetate, cerium nitrate, praseodymium nitrate, etc. U.S. Pat. No. 4,189,404 discloses the impregnation of alumina-based support composition with cerium nitrate.

In the first or bottom layer, there is optionally a first bulk oxygen storage composition comprising an oxygen storage component which is preferably ceria, and/or praseodymia in bulk form. Ceria is most preferred. By bulk form it is meant that the ceria and/or praseodymia is present as discrete particles which may be as small as 1 to 15 microns in diameter or smaller, as opposed to having been dispersed in solution as in the first layer. A description and the use of such bulk components is presented in U.S. Pat. No. 4,714,694, hereby incorporated by reference. As noted in U.S. Pat. No. 4,727,052, also incorporated by reference, bulk form means that particles of ceria are admixed with particles of activated alumina so that the ceria is present in solid or bulk form as opposed to, for example, impregnating alumina particles with a solution of ceria compound which upon calcination is converted to ceria disposed within the alumina particles.

In addition to the above listed components of the first layer composition and the second layer composition, it is optional that each layer contain a particular composite of zirconia and at least one rare earth oxide containing ceria. Such materials are disclosed for example in U.S. Pat. Nos. 4,624,940 and 5,057,483, hereby incorporated by reference. Particularly preferred are particles comprising greater than 50% of a zirconia-based compound and preferably from 60 to 90% of zirconia, from 10 to 30 wt. % of ceria and optionally up to 10 wt. %, and when used at least 0.1 wt. %, of a non-ceria rare earth oxide useful to stabilize the zirconia selected from the group consisting of lanthana, neodymia and yttria.

Both the first layer composition and second layer composition comprise a component which impart stabilization, preferably a first stabilizer in the first layer and second stabilizer in the second layer. The stabilizer is selected from the group consisting of alkaline earth metal compounds. Preferred compounds include compounds derived from metals selected from the group consisting of magnesium, barium, calcium and strontium. It is known from U.S. Pat. No. 4,727,052 that support materials, such as activated alumina, can be thermally stabilized to retard undesirable alumina phase transformations from gamma to alpha at elevated temperatures by the use of stabilizers or a combination of stabilizers. While a variety of stabilizers are disclosed, the first layer and second layer composition of the present invention use alkaline earth metal components. The alkaline earth metal components are preferably alkaline earth metal oxide. In a particularly preferred composition, it is desirable to use barium and strontium as the compound in the first and/or the second layer composition. The alkaline earth metal can be applied in a soluble form which upon calcining becomes the oxide. It is preferred that the soluble barium be provided as barium nitrate, barium acetate or barium hydroxide and the soluble strontium provided as strontium nitrate or strontium acetate, all of which upon calcining become the oxides.

One aspect of the present invention provides for applying one or more thermal stabilizers and/or catalytic promoter to a previously calcined coating of the activated alumina and catalytic components on a carrier substrate. In other aspects of the invention, one or more additive may be applied to the activated alumina either before or after the alumina particles are formed into an adherent, calcined coating on the carrier substrate. (As used herein, a "precursor", whether of a thermal stabilizer, or other modifier or other component, is a compound, complex or the like which, upon calcining or upon use of the catalyst, will decompose or otherwise be converted into, respectively, a thermal stabilizer, other modifier or other component.) The presence of one or more of the metal oxide thermal stabilizers tends to retard the phase transition of high surface area aluminas such as gamma and eta aluminas to alpha-alumina, which is a low surface area alumina. The retardation of such phase transformation tends to prevent or reduce the occlusion of the catalytic metal component by the alumina with the consequent decrease of catalytic activity.

In each of the first layer and second layer compositions, the amount of metal oxide thermal stabilizer combined with the alumina may be from about 0.05 to 30 weight percent, preferably from about 0.1 to 25 weight percent, based on the total weight of the combined alumina, stabilizer and catalytic metal component.

Additionally, both the first layer composition and the second layer composition contain a compound derived from zirconium, preferably zirconium oxide. The zirconium compound can be provided as a water soluble compound such as zirconium acetate or as a relatively insoluble compound such as zirconium hydroxide. There should be an amount sufficient to enhance the stabilization and promotion of the respective compositions.

Both the first layer composition and the second layer composition contain at least one first promoter selected from the group consisting of lanthanum metal components and neodymium metal components with the preferred components being lanthanum oxide (lanthana) and neodymium oxide (neodymia). In a particularly preferred composition, there is lanthana and optionally a minor amount of neodymia in the bottom layer, and neodymia or optionally lanthana in the top coat. While these compounds are known to act as stabilizers for the alumina support, their primary purpose in the composition of the present invention is to act as reaction promoters for the respective first and second layer compositions. A promoter is considered to be a material which enhances the conversion of a desired chemical to another. In a TWC the promoter enhances the catalytic conversion of carbon monoxide and hydrocarbons into water and carbon dioxide and nitrogen oxides into nitrogen and oxygen.

The first and second layers preferably contain lanthanum and/or neodymium in the form of their oxides. However, these compounds are preferably initially provided in a soluble form such as an acetate, halide, nitrate, sulfate or the like to impregnate the solid components for conversion to oxides. It is preferred that in both the top coat and the bottom coat that the promoter be in intimate contact with the other components in the composition including and particularly the platinum group metal.

The first layer composition and/or the second layer composition of the present invention can contain other conventional additives such as sulfide suppressants, e.g., nickel or iron components. If nickel oxide is used, an amount from about 1 to 25% by weight of the first coat can be effective. As disclosed in U.S. Pat. No. 5,057,483 hereby incorporated by reference.

A particularly useful layered catalyst composite of the present invention comprises in the first layer from about 0.003 to 0.3 g/in$^3$ of the first palladium component; from about 0 to 0.065 g/in$^3$ of the first platinum group metal component other than palladium; from about 0.15 to about 2.0 g./in$^3$ of the first support, i.e., alumina; at least about 0.05 g/in$^3$ of the total first oxygen storage component in intimate contact with the palladium component; from about 0.025 to about 0.5 g/in$^3$ of at least one first alkaline earth metal components; from about 0.025 to about 0.5 g/in$^3$ of the first zirconium component; from about 0.025 to about 0.5 g/in$^3$ of at least one first rare earth metal component selected from the group consisting of lanthanum metal components and neodymium metal components; and comprises in the second layer from about 0.003 to 0.3 g/in$^3$ of the second palladium component and from about 0 to 0.065 g/in$^3$ of a second rhodium component or a second platinum component or mixture thereof, from about 0.15 g/in$^3$ to about 2.0 g/in$^3$ of the second support, i.e., alumina; and from about 0.025 to about 0.5 g/in$^3$ of the second zirconium component. This first and/or second layers can further comprise from about 0.025 g/in$^3$ to about 0.5 g/in$^3$ of a nickel component. The first and/or second layers further can include the particulate composite of zirconia and ceria in amounts from 0.0 to 2.0 g/in$^3$ comprising 60 to 90 wt. % zirconia, 10 to 30 wt. % ceria and from 0 to 10 wt % rare earth oxides comprising lanthana, neodymia and mixtures thereof. Weight of the palladium component and other platinum group metal components are based on the weight of the metal.

The catalyst composite can be coated in layers on a monolithic substrate generally which can comprise from about 0.50 to about 6.0, preferably about 1.0 to about 5.0 g/in$^3$ of catalytic composition based on grams of composition per volume of the monolith.

The catalyst composite of the present invention can be made by any suitable method. A preferred method comprises mixing a first mixture of a solution of at least one water-soluble or dispersible, first palladium component and a finely-divided, high surface area, refractory oxide which is sufficiently dry to absorb essentially all of the solution. The first platinum group metal component other than palladium, when used, can be supported on the same or different refractory oxide particles as the palladium component.

The first supported palladium and other components are then added to water and preferably comminuted to form the first coat (layer) slurry. The first supported platinum group component other than palladium may be comminuted with the first support palladium component, or separately and combined with the other components to form the first coat slurry. Preferably, the slurry is acidic, having a pH of less than 7 and preferably from 3 to 7. The pH is preferably lowered by the addition of an acid, preferably acetic acid to the slurry. In particularly preferred embodiments the first coat slurry is comminuted to result in substantially all of the solids having particle sizes of less than 10 micrometers in average diameter. The first coat slurry can be formed into a first layer and dried. The first palladium component and optional platinum components other than palladium components in the resulting first mixture in the first layer are converted to a water insoluble form chemically or by calcining. The first layer is preferably calcined, preferably at least 250° C.

A second mixture of a solution of at least one water-soluble second palladium component and a finely-divided, high surface area, refractory oxide which is sufficiently dried to absorb essentially all of the solution is mixed. The second platinum group metal component, when used, may be supported on the same or different refractory oxide particles as the palladium component. Preferably, rhodium components are supported on different refractory oxide particles other than the palladium component. The supported second palladium component and other components are added to water and are preferably comminuted to form the second coat slurry. The supported second platinum group metal component other than palladium may be comminuted with the palladium component or separately and then combined with the supported palladium component and other components to form the second coat slurry. Preferably, the second slurry is acidic, having a pH of less than 7 and preferably from 3 to 7. The pH is preferably lowered by the addition of an acid, preferably nitric acid to the slurry. In particularly preferred embodiments the second coat slurry is comminuted to result in substantially all of the solids having particle sizes of less than 10 micrometers in average diameter. The second slurry can be formed into a second layer on the first layer and dried. The second palladium group component and optionally the second platinum group metal component other than palladium in the resulting second coat mixture can be converted to insoluble form chemically or by calcining. The second layer is preferably then calcined, preferably at at least 250° C.

Alternatively, each layer of the present composite can also be prepared by the method disclosed in U.S. Pat. No. 4,134,860 (incorporated by reference).

In order to deposit the first and second coat slurries on a macrosized carrier, one or more comminuted slurries are applied to the carrier in any desired manner. Thus the carrier may be dipped one or more times in the slurry, with intermediate drying if desired, until the appropriate amount of slurry is on the carrier. The slurry employed in depositing the catalytically-promoting metal component-high area support composite on the carrier will often contain about 20 to 60 weight percent of finely-divided solids, preferably about 25 to 55 weight percent.

The first layer composition of the present invention and second layer composition of the present invention can be prepared and applied to a suitable substrate, preferably a metal or ceramic honeycomb carrier. The comminuted catalytically-promoting metal component-high surface area support composite can be deposited on the carrier in a desired amount, for example, the composite may comprise about 2 to 40 weight percent of the coated carrier, and is preferably about 5 to 30 weight percent for a typical ceramic honeycomb structure. The composite deposited on the carrier is generally formed as a coating over most, if not all, of the surfaces of the carrier contacted. The combined structure may be dried and calcined, preferably at a temperature of at least about 250° C. but not so high as to unduly destroy the high area of the refractory oxide support, unless such is desired in a given situation.

The carriers useful for the catalysts made by this invention may be metallic in nature and be composed of one or more metals or metal alloys. The metallic carriers may be in various shapes such as corrugated sheet or in monolithic form. Preferred metallic supports include the heat-resistant, base-metal alloys, especially those in which iron is a substantial or major component. Such alloys may contain one or more of nickel, chromium, and aluminum, and the total of these metals may advantageously comprise at least about 15 weight percent of the alloy, for instance, about 10 to 25 weight percent of chromium, about 3 to 8 weight percent of aluminum and up to about 20 weight percent of nickel, say at least about 1 weight percent of nickel, if any or more than a trace amount be present. The preferred alloys may contain small or trace amounts of one or more other metals such as manganese, copper, vanadium, titanium and the like. The surfaces of the metal carriers may be oxidized at quite elevated temperatures, e.g. at least about 1000° C., to improve the corrosion resistance of the alloy by forming an oxide layer on the surface of carrier which is greater in thickness and of higher surface area than that resulting from ambient temperature oxidation. The provision of the oxidized or extended surface on the alloy carrier by high temperature oxidation may enhance the adherence of the refractory oxide support and catalytically-promoting metal components to the carrier.

Any suitable carrier may be employed, such as a monolithic carrier of the type having a plurality of fine, parallel gas flow passages extending therethrough from an inlet or an outlet face of the carrier, so that the passages are open to fluid flow therethrough. The passages, which are essentially straight from their fluid inlet to their fluid outlet, are defined by walls on which the catalytic material is coated as a "washcoat" so that the gases flowing through the passages contact the catalytic material. The flow passages of the monolithic carrier are thin-walled channels which can be of any suitable cross-sectional shape and size such as trapezoidal, rectangular, square, sinusoidal, hexagonal, oval, circular. Such structures may contain from about 60 to about 600 or more gas inlet openings ("cells") per square inch of cross section. The ceramic carrier may be made of any suitable refractory material, for example, cordierite, cordierite-alpha alumina, silicon nitride, zircon mullite, spodumene, alumina-silica magnesia, zircon silicate, sillimanite, magnesium silicates, zircon, petalite, alpha alumina and aluminosilicates. The metallic honeycomb may be made of a refractory metal such as a stainless steel or other suitable iron based corrosion resistant alloys.

Such monolithic carriers may contain up to about 700 or more flow channels ("cells") per square inch of cross section, although far fewer may be used. For example, the carrier may have from about 60 to 600, more usually from about 200 to 400, cells per square inch ("cpsi").

The discrete form and second coats of catalytic material, conventionally referred to as "washcoats", are coated onto a suitable carrier with, preferably, the first coat adhered to the carrier and the second coat overlying and adhering to the first coat. With this arrangement, the gas being contacted with the catalyst, e.g., being flowed through the passageways of the catalytic material-coated carrier, will first contact the second or top coat and pass therethrough in order to contact the underlying bottom or first coat. However, in an alternative configuration, the second coat need not overlie the first coat but may be provided on an upstream (as sensed in the direction of gas flow through the catalyst composition) portion of the carrier, with the first coat provided on a downstream portion of the carrier. Thus, to apply the washcoat in this configuration, an upstream longitudinal segment only of the carrier would be dipped into a slurry of the second coat catalytic material, and dried, and the undipped downstream longitudinal segment of the carrier would then be dipped into a slurry of the first coat catalytic material and dried.

Alternatively, separate carriers may be used, one carrier on which the first coat is deposited and a second carrier on which the second coat is deposited, and then the two separate carriers may be positioned within a canister or other holding device and arranged so that the exhaust gas to be treated is flowed in series first through the catalyst containing the second coat and then through the catalyst containing the first coat thereon. However, as indicated above, it is preferred to utilize a catalyst composition in which the second coat overlies and adheres to the first coat because such configuration is believed both to simplify production of the catalyst composition and to enhance its efficacy.

The following detailed description relates to a preferred embodiment in which the various components of the catalyst material according to the present invention are divided into two distinct coats. It will be understood, however, that the present invention includes embodiments in which the first layer composition and second layer composition may be incorporated into a single washcoat consisting of discrete particles of each composition.

The First or Bottom Layer

The first layer composition provides sufficient oxygen storage capacity to enhance the CO oxidation and nitrogen oxide reduction. The ceria in intimate contact with palladium catalytic component is believed to facilitate the redox properties of the ceria at elevated temperatures (e.g. above 500° C.). Thus, a fully oxidized ceria surface can easily react with CO component to form $CO_2$ and resulting a reduced ceria surface. The reduced ceria surface then re-oxidizes by the NO and/or oxygen component in the exhaust. The ceria-palladium combination provides significant better efficiencies in CO and NO conversions of the palladium containing catalyst at elevated temperatures. Palladium metal component, in an sufficient amount, is very effective for hydrocarbon conversion. The stabilizers and promoters are thought to stabilize and promote both the washcoat composition and palladium activity.

The first activated alumina support in the first layer may be present in an amount from about 0.15 $g/in^3$ to 2.0 $g/in^3$. It is desirable to have high concentration (e.g. greater than 4 wt %) palladium supported on the alumina. It is found that high concentration of palladium on alumina support appears to exhibit higher hydrocarbon conversion in the first layer composition. The amount of palladium present in the first layer is at least 10 $g/ft^3$, preferably greater than 20 $g/ft^3$.

The oxygen storage component may further include praseodymia since praseodymia similar to ceria is capable of exhibiting redox process at elevated temperatures. The amount of oxygen storage component such as ceria in the first layer may be at least about 0.05 $g/in^3$, for example, from 0.2 to 1.5 $g/in^3$ of the finished catalyst composition. The alkaline earth metal oxide and zirconia stabilizer are preferably from about 0.025 $g/in^3$ to 0.5 $g/in^3$ respectively. The rare earth metal oxide promoters are preferably from 0.025 $g/in^3$ to 0.50 $g/in^3$ respectively.

It is advantageous to incorporate a bulk fine particulate material of co-formed rare earth oxide-zirconia composite, e.g. ceria-zirconia and/or ceria-neodymia-zirconia composition as an additional catalytic promoter as described in U.S. Pat. No. 5,057,483. These particles do not react with the stabilized alumina washcoat and maintain a BET surface area of about 40 $m^2$/gram upon exposure to 900° C. for a long period of time. Ceria in these thermally stable particles contributes additional stable oxygen storage redox capacity. The ceria content in the rare earth oxide-zirconia composite is preferably from 10 wt % to 30 wt % of the total weight of the composite. Neodymia, if present in the composite is preferably from 0 to 10 wt % of the total weight of the composite. It is understood that the rare earth oxide specified as ceria component may contain mixtures of other rare earth oxides in minor quantity. Thus, the ceria may contain up to 10 wt % other rare earth oxides in the composition. The rare earth oxide-zirconia particles, if present, are preferably from 0.1 $g/in^3$ to 2.0 $g/in^3$ of the finished catalyst composition. It is desirable to include a $H_2S$ suppressor metal oxide in the first layer composition. For example, NiO in a particulate form may be present in an quantity from 0.025 $g/in^3$ to 0.5 $g/in^3$. The first layer may also contain other components useful as components of a washcoat, including a supplementary refractory metal oxide such as cordierite to enhance washcoat physical properties.

In the preparation of the first (bottom) layer, palladium supported on alumina is ball milled with additional components for a suitable time to obtain 90% of the particles having a particle size of less than about 20, preferably less than 10 and most preferably from 5 to 10 microns. In addition to the palladium supported alumina, other components of the first layer composition can be added to the ball mill including the oxygen storage component, stabilizers and promoters. There can be included the particulate composite of zirconia and rare earth oxide. The ball milled composition is then combined with a nickel oxide compound as well as recycled milled honeycomb. This first layer composition can be combined as a slurry with a suitable vehicle, preferably water, in an amount from 20 to 60% solid and preferably 25 to 55% solid.

The Second or Top Layer

The second layer composition comprises an alumina supported palladium catalytic component free from intimate contact with the ceria component. It is believed that palladium-ceria combination which exhibits high activities at elevated temperatures (e.g. above 500° C.) shows lower activities especially in HC and $NO_x$ conversions at lower temperatures (typically between 350° C. and 450° C.). This effect has been demonstrated in Example II described in U.S. Pat. No. 4,624,940. It is believed that the palladium-ceria interaction impairs the low temperature HC and $NO_x$ activities of the palladium catalytic component. Thus, the first palladium catalytic component in the first layer performs well once the catalyst is heated and reaches an operating temperature of about 500° C. The second palladium catalytic component in the second layer provides sufficient catalytic activity during the initial heating and at an operating temperature below 500° C. The palladium catalytic components of this invention clearly improve the palladium performances by widening the operating temperature window of the catalyst.

The second activated alumina support in the second layer may be present in an amount from about 0.15 $g/in^3$ to 2.0 $g/in^3$. It is preferred that the palladium supported on the alumina have a relatively high concentration (e.g. greater than 3 wt %). The amount of palladium in the second layer is at least 10 $g/ft^3$, preferably greater than 20 $g/ft^3$. The alkaline earth metal oxide, preferably strontium and zirconia components are preferably in an amount from about 0.025 g/in³ to 0.50 g/in³ respectively. The rare earth metal oxide promoters (neodymia and/or lanthana) are preferably in an amount from 0.025 g/in³ to 0.50 g/in³ respectively. Optionally, the bulk fine particulate material of co-formed rare earth oxide-zirconia composite as described in the first layer composition may be added to the second layer composition. The ceria component in the composite particles does not readily interact with the palladium catalytic component. Thus, the undesirable palladium-ceria interaction in the second layer can be avoided.

A second layer composition is formed by combining a palladium metal solution, dispersed on a refractory inorganic oxide support, preferably alumina. This combination with the second stabilizer which can include zirconia hydroxide and optionally a particulate composite comprising zirconia and rare earth oxides as described above, preferably zirconia in combination with ceria optionally containing neodymia and/or lanthana. This combination is combined with a suitable vehicle such as water to result in a composition comprising 45% solids which is ball milled to obtain particles of less than 25 microns, preferably less than 15 microns and typically from 5 to 10 microns. At this point stabilizing components such as strontium nitrate and promoting components including neodymium and/or lanthanum nitrate are added and the composition milled for up to 30 minutes. This results in a slurry having from 20 to 50% solids and a viscosity of from 50 to 80 centipores.

A carrier such as those described above, i.e., a cordierite monolith, is first dipped into the first washcoat with a target layering of from about 0.5 to 3.0 grams per cubic inch ("g/in³") of carrier. The carrier is then dried in air at from about 100° C. to 120° C. until dry, and is then calcined in air at from about 400° C. to 600° C. for a period of from 0.25 to 2 hours. The carrier is then dipped into the second washcoat with a target coating weight (including bottom layer) of from about 1.0 to 5.0 g/in³ of the carrier, is then dried in air at from about 100° C. to 120° C. and calcined in air at from about 400° C. to 600° C. for about 0.25 to 2 hours.

The catalytic compositions made by the present invention can be employed to promote chemical reactions, such as reductions, methanations and especially the oxidation of carbonaceous materials, e.g., carbon monoxide, hydrocarbons, oxygen-containing organic compounds, and the like, to products having a higher weight percentage of oxygen per molecule such as intermediate oxidation products, carbon dioxide and water, the latter two materials being relatively innocuous materials from an air pollution standpoint. Advantageously, the catalytic compositions can be used to provide removal from gaseous exhaust effluents of uncombusted or partially combusted carbonaceous fuel components such as carbon monoxide, hydrocarbons, and intermediate oxidation products composed primarily of carbon, hydrogen and oxygen, or nitrogen oxides. Although some oxidation or reduction reactions may occur at relatively low temperatures, they are often conducted at elevated temperatures of, for instance, at least about 100° C., typically about 150° to 900° C., and generally with the feedstock in the vapor phase. The materials which are subject to oxidation generally contain carbon, and may, therefore, be termed carbonaceous, whether they are organic or inorganic in nature. The catalysts are thus useful in promoting the oxidation of hydrocarbons, oxygen-containing organic components, and carbon monoxide, and the reduction of nitrogen oxides. These types of materials may be present in exhaust gases from the combustion of carbonaceous fuels, and the catalysts are useful in promoting the oxidation or reduction of materials in such effluents. The exhaust from internal combustion engines operating on hydrocarbon fuels, as well as other waste gases, can be oxidized by contact with the catalyst and molecular oxygen which may be present in the gas stream as part of the effluent, or may be added as air or other desired form having a greater or lesser oxygen concentration. The products from the oxidation contain a greater weight ratio of oxygen to carbon than in the feed material subjected to oxidation. Many such reaction systems are known in the art.

A method aspect of the present invention provides a method for treating a gas containing noxious components comprising one or more of carbon monoxide, hydrocarbons and nitrogen oxides, by converting at least some of each of the noxious components initially present to innocuous substances such as water, carbon dioxide and nitrogen. The method comprises the step of contacting the gas under conversion conditions (e.g., a temperature of about 100° to 950° C. of the inlet gas to the catalyst composition) with a catalyst composition as described above.

The present invention is illustrated further by the following examples which are not intended to limit the scope of this invention.

EXAMPLES

Example 1

A. The First Layer

A quantity of 700 grams of gamma alumina powder having a surface area of 150 square meters per gram (150 m²/g) was impregnated with an aqueous palladium nitrate solution containing 31.9 grams of palladium. All 31.9 grams of palladium were impregnated. The palladium containing alumina, a nitric acid stabilized colloidal dispersion of ceria containing 300 grams $CeO_2$ (Note: The average $CeO_2$ particle size is about 100 angstrom. This is not bulk ceria.), cerium nitrate crystals in an amount sufficient to form 500 grams $CeO_2$, lanthanum nitrate crystals in an amount sufficient to form 100 grams $La_2O_3$, barium acetate crystals in an amount sufficient to form 60 grams BaO, zirconium acetate solution in an amount sufficient to form 140 grams $ZrO_2$ and 500 grams of co-formed ceria-zirconia powder (surface area 50 m²/g containing 20 wt % $CeO_2$) were ballmilled with acetic acid to form a slurry. The slurry was further mixed with 70 grams of pre-milled NiO particles in water to form a washcoat layering slurry containing about 48 percent by weight of solids. A monolith support of cordierite containing about 400 flow passages per square inch of cross section was dipped into the washcoat slurry. The excess was blown off the monolith by compressed air. The resultant catalyzed monolith after being calcined at 450° C. contained 55 g/ft³ palladium, 0.7 g/in³ alumina, 0.8 g/in³ $CeO_2$, 0.1 g/in³ $La_2O_3$, 0.14 g/in³ $ZrO_2$, 0.06 g/in³ BaO, 0.5 g/in³ ceria-zirconia composite and 0.07 g/in³ NiO.

B. The Second Layer

A quantity of 700 grams of the same type alumina powder as used in Part A was impregnated with palladium nitrate aqueous solution containing 31.9 grams of palladium. All 31.9 grams of palladium were impregnated. The palladium containing alumina, lanthanum nitrate crystals in an amount sufficient to form 100 grams $La_2O_3$, neodymium nitrate crystals in an amount sufficient to form 100 grams $Nd_2O_3$, zirconium nitrate crystals in an amount sufficient to form 100 grams $ZrO_2$ and strontium nitrate crystals in an amount sufficient to form 100 grams SrO were ballmilled with water to form a washcoat layering slurry which contained about 30 percent by weight solids. The monolith layered with the first layer in Part A of this Example was dipped in the second layer slurry. After blowing off the excess and drying and calcining at 450° C., the monolith picked up an additional 1.13 g/in$^3$ of washcoat Containing 55 g/ft$^3$ palladium, 0.7 g/in$^3$ alumina, 0.1 g/in$^3$ La$_2$O$_3$, 0.1 g/in$^3$ Nd$_2$O$_3$, 0.1 g/in$^3$ ZrO$_2$ and 0.1 g/in$^3$ SrO. The final catalyzed monolith contained 110 g/ft$^3$ of palladium.

Example 2 (Comparative Example)

A layered palladium containing monolithic catalyst structure was prepared using similar ceria sources and loadings as described in Example 1. In this comparative example, the palladium catalytic components in both coatings were supported on a La-Ba stabilized alumina (similar to the alumina material described in Example IV of U.S. Pat. No. 4,624,940) and were in intimate contact with a ceria component. The first layer after calcination at 450° C. contained 55 g/ft$^3$ palladium, 0.6 g/in$^3$ La-Ba stabilized alumina, 0.4 g/in$^3$ CeO$_2$ (from nitric acid stabilized colloidal ceria solution). The second layer after calcination at 450° C. contains 55 g/ft$^3$ palladium, 0.8 g/in$^3$ La-Ba stabilized alumina, 0.4 g/in$^3$ CeO$_2$ (from cerium nitrate), 0.1 g/in$^3$ La$_2$O$_3$ (from lanthanum nitrate), 0.05 g/in$^3$ BaO (from barium nitrate), 0.05 g/in$^3$ ZrO$_2$ (from zirconium nitrate), 0.05 g/in$^3$ NiO (from pre-milled bulk oxide) and 0.5 g/in$^3$ ceria-zirconia composite. In both the top layer and bottom layer the palladium was in intimate contact with CeO$_2$.

Example 3 (Comparative Example)

A 400 cell/in$_2$ monolithic catalyst was prepared to have equivalent amounts of total ceria loading by essentially following the procedures described in Example IV of U.S. Pat. No. 4,624,940. The final catalyzed monolith contained 110 g/ft$^3$ palladium, 1.2 g/in$^3$ La-Ba stabilized alumina, 0.9 g/in$^3$ CeO$_2$ (from a bulk ceria containing 95 wt % CeO$_2$ and having a BET surface area of 120m$^2$/g) and 0.3 g/in$^3$ crushed cordierite.

Samples of the catalyst honeycomb structure were cored from the monolith as cylinders 1.5 inches in diameter and 3 inches in length each removed from the corresponding monolithic unit, produced according to Examples 1, 2 and 3. Each was individually loaded in a laboratory reactor and aged at 950° C. under a simulated aging cycle for 12 hours. The aging cycle employed a perturbation of ±0.5 air to fuel ratio (A/F)@0.16 Hz@stoichiometric set point an A/F of about 14.6 using a simulated exhaust composition. After the aging, the catalyst was evaluated on the same reactor at 450° C. (inlet temperature), under ±0.3 A/F@0.5 Hz perturbation and 25,000 VHSV space velocity at an A/F of about 14.6 using a simulated exhaust composition (Feed Gas). The results of conversion efficiencies are presented in Table I.

TABLE I

| | Conversion Efficiencies of aged palladium containing catalysts % Conversion @ stoich. A/F set point | | |
|---|---|---|---|
| Catalyst | HC | CO | NO$_x$ |
| Ex 1 | 99 | 99 | 83 |
| Ex 2 (Comparative) | 93 | 95 | 65 |
| Ex 3 (Comparative) | 91 | 84 | 50 |

Feed gas: 0.75% CO, 0.2% H$_2$, 0.63% O$_2$, 16.3% CO$_2$, 10% H$_2$O 1400 ppm NO, 235 ppm C$_3$H$_6$, 235 ppm C$_3$H$_8$, 45 ppm SO$_2$ balance N$_2$. (Average gas composition)

It is readily noticed from Table I that the palladium catalyst of the Comparative Example 3 composition does not perform as well as the catalyst composite of Example 1 at an operating temperature about 450° C. With the improvement in the ceria component by incorporating base metal oxide stabilizers and promoters, the catalyst of the Comparative Example 2 has significantly better performance in CO and NOx conversions than that of the catalyst of Comparative Example 3. However, since all the palladium catalytic components in the catalyst of the composition of the Comparative Example 2 are in intimate contact with the ceria component the HC and NO$_x$ conversions are limited. By separating palladium component in discrete layering compositions, the catalyst composite of this invention clearly demonstrates its superior activities as demonstrated in catalyst Ex. 1 in Table I.

Example 4

A two layered catalyst was prepared for comparison by essentially following the procedures for producing Example 1.

A. The First Coat

A quantity of 700 grams of gamma alumina powder having a surface area of 150 meters per gram was impregnated with a Pd nitrate solution containing 31.9 grams of Pd. The palladium containing alumina, nitric acid stabilized colloidal dispersion ceria solution containing 300 grams CeO2 and cerium nitrate crystals containing 500 grams CeO2, lanthanum nitrate crystals containing 100 grams La2O3, barium acetate crystals containing 60 grams BaO, zirconium acetate solution containing 140 grams ZrO2 and 500 grams co-formed ceria-zirconia powder (surface area 50 m$^2$/g containing 20 wt % CeO2) were ballmilled with acetic acid to form a slurry. The slurry was further mixed with 70 grams pre-milled NiO particles in water to form a washcoat coating slurry. A monolith support of cordierite containing about 400 flow passages per square inch of cross section was dipped into the slurry to obtain proper washcoat loading. The resultant catalyzed monolith after calcined at 450° C. for one hour in air contains 55 g/ft3 Pd, 0.7 g/in3 alumina, 0.8 g/in3 CeO2, 0.1 g/in3 La2O3, 0.14 g/in3 ZrO2, 0.06 g/in3 BaO, 0.5 g/in3 ceria-zirconia composite and 0.07 g/in3 NiO.

B. The Second Coat

A quantity of 700 grams of the alumina powder was impregnated with Pd nitrate solution containing 31.9 grams of palladium. The palladium containing alumina, lanthanum nitrate crystals containing 100 grams La2O3, neodymium nitrate crystals containing 100 grams Nd2O3, zirconium nitrate crystals containing 100 grams ZrO2 and barium hydroxide crystals containing 100 grams BaO were ballmilled with water to form a washcoat coating slurry. The monolith coated with the first coat was dipped in the second coat slurry to obtain proper washcoat loading. After calcining at 450° C. for one hour in air, the monolith picked up an additional 1.13 g/in3 of washcoat containing 55 g/ft3 Pd, 0.7 g/in3 alumina, 0.1 g/in3 La2O3, 0.1 g/in3 Nd2O3, 0.1 g/in3 ZrO2 and 0.1 g/in3 BaO. The final catalyzed monolith contains 110 g/ft3 of Pd. This catalyst sample is designated as Catalyst C1.

Example 5

A two layered catalyst was prepared according to the present invention. 10 g/ft3 Pt supported on an alumina was incorporated into the second coat composition of the Example 4.

The first coat of this catalyst has identical composition as the Example 4, First Coat.

The second coat was prepared according to the following procedures. A quantity of 978.5 grams of gamma alumina powder having a surface area of 150 m2/g was impregnated with an amine-solubilized platinum hydroxide solution containing 21.5 grams of platinum. The powder after calcining at 450° C. contains 2.15% Pt. 270 grams of this Pt/alumina powder was mixed with the second coat ingredients of the Example 4 in a ballmill to form a washcoat coating slurry. The monolith coated with the first coat was dipped into the second coat slurry to obtain the desirable amounts of washcoat loading. After calcining at 450° C. for one hour in air, the monolith picked up an additional 1.4 g/in3 of washcoat containing 55 g/ft3 Pd, 10 g/ft3 Pt, 0.97 g/in3 alumina, 0.1 g/in3 La2O3, 0.1 g/in3 Nd2O3, 0.1 g/in3 ZrO2 and 0.1 g/in3 BaO. The final catalyzed monolith contains 110 g/ft3 Pd and 10 g/ft3 Pt. This catalyst sample is designated as Catalyst Ex. 5.

Example 6

A two layered catalyst was prepared according to one embodiment of the present invention. 10 g/ft3 Pt supported on an alumina was incorporated into the first coat composition of the Example 4.

270 grams of a 2.15% Pt/alumina powder prepared in Example 5 was mixed with the first coat ingredients of Example 1 in a ballmill to form a washcoat coating slurry. A 400 cells/in2 cordierite monolith was dipped into the slurry to obtain the desirable amounts of washcoat loading. After calcining at 450° C. for one hour, the catalyzed monolith contains 55 g/ft3 Pd, 10 g/ft3 Pt, 0.97 g/in3 alumina, 0.8 g/in3 CeO2, 0.1 g/in3 La2O3, 0.14 g/in ZrO7, 0.06 g/in3 BaO, 0.5 g/in3 ceria-zirconia composite and 0.07 g/in3 NiO. A second coat of identical composition as the second coat of Example 4 was coated over the first coat. After calcining at 450° C. for one hour, the final catalyzed monolith contains 110 g/ft3 Pd and 10 g/ft3 Pt. This catalyst sample is identified as Catalyst Ex. 6.

Example 7

A two layered catalyst was prepared according to the present invention. 2 g/ft3 Rh supported on an alumina was incorporated into the second coat composition of Example 4.

The first coat of this catalyst has identical composition as Example 4.

270 grams of gamma alumina powder (surface area 150 m2/g) was impregnated with a rhodium nitrate solution containing 1.16 grams Rh. The Rh containing alumina powder was mixed with the second coat ingredients of Example 4 in a ballmill to form a washcoat coating slurry. The monolith coated with the first coat was dipped into the second coat slurry to obtain the desirable amounts of washcoat loading. After calcining at 450° C. for one hour, the monolith picked up an additional 1.4 g/in3 of washcoat containing 55 g/ft3 Pd, 2 g/ft3 Rh, 0.97 g/in3 alumina, 0.1 g/in3 La2O3, 0.1 g/in³ Nd2O3, 0.1 g/in³ ZrO2 and 0.1 g/in³ BaO. The final catalyzed monolith contains 110 g/ft3 Pd and 2 g/ft3 Rh. This catalyst sample is designated as Catalyst Ex. 7.

Example 8

A two layered catalyst was prepared according to another embodiment of the present invention. 10 g/ft3 Pt and 2 g/ft3 Rh were incorporated into the second coat composition of Example 4.

The first coat of this catalyst has identical composition as Example 4.

270 grams of 2.15% Pt/alumina powder prepared in Example 5 was further impregnated with a rhodium nitrate solution containing 1.16 grams Rh. The Pt/Rh containing alumina powder was mixed with the second coat ingredients of Example 4 in a ballmill to form a washcoat coating slurry. A monolith coated with the first coat was dipped into the slurry to obtain desirable amounts of washcoat loading. After calcining at 450° C. for one hour, the monolith picked up an additional washcoat containing 55 g/ft3 Pd, 10 g/ft3 Pt, 2 g/ft3 Rh, 0.97 g/in3 alumina, 0.1 g/in³ La2O3, 0.1 g/in3 Nd2O3, 0.1 g/in³ ZrO2 and 0.1 g/in³ BaO. The final catalyzed monolith contains 110 g/ft3 Pd, 10 g/ft3 Pt and 2 g/ft3 Rh. This catalyst sample is identified as Catalyst Ex. 8.

Example 9 (Comparative)

Comparative catalyst, not in accordance with the present invention

A single coat catalyst was prepared by combining the first coat slurry and the second coat slurry of Example 8 to form a washcoat coating slurry. A 400 cells/in2 cordierite monolith was dipped into the slurry to obtain the desirable amounts of washcoat loading. After calcining at 450° C. for one hour in air, the final catalyzed monolith contains 110 g/ft3 Pd, 10 g/ft3 Pt, 2 g/ft3 Rh, 1.67 g/in3 alumina, 0.8 g/in3 CeO2, 0.2 g/in2 La2O3, 0.1 g/in3 Nd2O3, 0.24 g/in3 ZrO2, 0.16 g/in3 BaO, 0.5 g/in³ co-formed ceria-zirconia composite and 0.07 g/in3 NiO. This catalyst sample is designated as Catalyst C2.

Example 10

Cores of 1.5 inches in diameter and 3 inches in length were cut and separated from each of the monolithic catalysts of C1, Ex. 5, Ex. 6, Ex. 7, Ex. 8 and C2. The cores were respectively loaded in a laboratory reactor and aged at 950° C. for 24 hours in a flow nitrogen stream containing 10% water at 25,000 VHSV space velocity. The aged catalyst cores were then individually loaded in a laboratory test reactor and evaluated using a simulated exhaust composition employing a perturbation of ±0.5 A/F@1 Hz@stoichiometric set point and 50,000 VHSV space velocity. The average feed gas compositions at the evaluation conditions contain 0.72% CO, 0.24% H2, 0.63% O2, 1400 ppm NO, 230 ppm C3H6, 230 ppm C3H8, 10% H20, 16% CO2, 45 ppm SO2 and balance N2. The results of light-off performances and conversion efficiencies at 450° C. are respectively presented in Table II and Table III.

TABLE II

Light off performances of aged monolithic catalyst
Light-off activities (up to 460° C.)

| Catalyst | HC (°C.) | | | CO (°C.) | | NO (°C.) | |
|---|---|---|---|---|---|---|---|
| | $T_{50}$ | $T_{75}$ | $T_{90}$ | $T_{50}$ | $T_{75}$ | $T_{50}$ | $T_{75}$ |
| C1 | 315 | 369 | — | 302 | 329 | 304 | — |
| EX. 5 | 311 | 353 | — | 305 | 313 | 309 | — |
| EX. 6 | 313 | 345 | — | 303 | 323 | 303 | — |
| EX. 7 | 311 | 370 | 459 | 306 | 319 | 298 | 312 |
| EX. 8 | 295 | 337 | 441 | 287 | 306 | 278 | 289 |
| C2 | 316 | 396 | — | 302 | 336 | 399 | — |

$T_{50}$, $T_{75}$ and $T_{90}$ represent temperatures to reach 50%, 75% and 90% conversion efficiencies respectively.

TABLE III

Conversion Efficiencies of Aged Monolithic Catalysts
% Conversion at 450° C.

| Catalyst | HC | CO | NO |
|---|---|---|---|
| C1 | 85 | 80 | 67 |
| EX. 5 | 89 | 84 | 67 |
| EX. 6 | 89 | 82 | 70 |
| EX. 7 | 90 | 81 | 70 |
| EX. 8 | 91 | 85 | 78 |
| C2 | 85 | 82 | 68 |

By reference to Table II and Table III, it is apparent that addition of Pt (e.g. Ex. 5 and Ex. 6), Rh (i.e. Ex. 7) and Pt/Rh (i.e., Ex. 8) to the layered Pd composition of Example 4 (Catalyst C1) generally improve catalyst light-off performance and conversion efficiencies especially in the hydrocarbon and NOx conversions. It is also readily noticed that homogeneous (single coat) composition of Pt/Pd/Rh (Catalyst C2) does not show performance improvement over the layered Pd composition (Catalyst C1) even with additional amounts of platinum group metal components. The addition of Pt and/or Rh to a catalyst containing palladium in discrete layered composite of the present invention composite of this invention results in its superior activities.

What is claimed is:

1. A layered catalyst composite comprising a first layer and a second layer:
   the first layer comprising:
      a first support;
      at least one first palladium component; and
      a first oxygen storage component in intimate contact with the first palladium component; and
   the second layer comprising:
      a second support; and
      at least one second palladium component free from intimate contact with the oxygen storage component.

2. The layered catalyst composite as recited in claim 1 wherein the first and second supports are the same or different and are compounds selected from the group consisting of silica, alumina and titania compounds.

3. The layered catalyst composite as recited in claim 1 wherein the first and second supports are the same or different and are activated compounds selected from the group consisting of alumina, silica, silica-alumina, aluminosilicates, alumina-zirconia, alumina-chromia, and alumina-ceria.

4. The layered catalyst composite as recited in claim 3 wherein the first and second supports are activated alumina.

5. The layered catalyst composite as recited in claim 1 wherein at least one of the first and second layers further comprises a platinum group metal component other than palladium.

6. The layered catalyst composite as recited in claim 5 wherein the platinum group metal is selected from the group consisting of platinum, rhodium and mixtures thereof.

7. The layered catalyst composite as recited in claim 1 wherein the first oxygen storage component is selected from the group consisting of cerium and praseodymium compounds.

8. The layered catalyst composite as recited in claim 7 wherein the first oxygen storage component is ceria.

9. The layered catalyst composite as recited in claim 1 wherein at least one of the first or second layers further comprises a nickel or iron component.

10. The layered catalyst composite as recited in claim 9 wherein the first layer further comprises a nickel or iron component.

11. The layered catalyst composite as recited in claim 1 wherein the first layer further comprises:
    a first zirconium component;
    at least one first alkaline earth metal component; and
    at least one first rare earth metal component selected from the group consisting of lanthanum metal components and neodymium metal components; and
    wherein the second layer further comprises:
    a second zirconium component;
    at least one second alkaline earth metal component; and
    at least one second rare earth metal component selected from the group consisting of lanthanum metal components and neodymium metal components.

12. The layered catalyst composite as recited in claim 1 wherein the first layer further comprises:
    optionally a first zirconium component;
    optionally at least one first alkaline earth metal component; and
    optionally at least one first rare earth metal component selected from the group consisting of lanthanum metal components and neodymium metal components, wherein the first layer requires at least one first alkaline earth metal component and at least one first rare earth metal component; and a first zirconia component; and
    wherein the second layer further comprises:
    optionally a second zirconium component;
    optionally at least one second alkaline earth metal component; and
    optionally at least one second rare earth metal component selected from the group consisting of lanthanum metal components and neodymium metal components;
    Wherein at least one of the first layer and the second layer require at least one of the alkaline earth metal components, the rare earth metal components, and the second zirconia components.

13. The layered catalyst composite as recited in claim 12 wherein at least one first alkaline earth metal component and at least one second alkaline earth metal component are derived from a metal selected from the group consisting of magnesium, barium, calcium and strontium.

14. The layered catalyst composite as recited in claim 13 wherein at least one first or second alkaline earth metal component is derived from a metal selected from the group consisting of strontium and barium.

15. The layered catalyst composite as recited in claim 14 wherein the second alkaline earth metal component is strontium oxide and the first alkaline earth metal component is barium oxide.

16. The layered catalyst composite as recited in claim 12 wherein at least one of said first rare earth metal component and second rare earth metal is derived from lanthanum.

17. The layered catalyst composite as recited in claim 12 wherein at least one of said first or second rare earth metal component is derived from neodymium.

18. The layered catalyst composite as recited in claim 17 wherein the second rare earth metal component is derived from neodymium.

19. The layered catalyst composite as recited in claim 12 wherein there is:
    from about 0.003 to about 0.6 g/in$^3$ of at least one first palladium component;
    from 0 to 0.065 g/in$^3$ of at least one first platinum group metal other than palladium;
    from about 0.15 to about 2.0 g./in$^3$ of the first support;

at least about 0.05 g/in³ of the first oxygen storage component in intimate contact with the palladium component;

from about 0.025 to about 0.5 g/in³ of at least one first alkaline earth metal components;

from about 0.025 to about 0.5 g/in³ of the first zirconium component;

from about 0.025 to about 0.5 g/in³ of at least one first rare earth metal component selected from the group consisting of lanthanum metal components and neodymium metal components;

from about 0.003 to about 0.6 g/in³ of at least one second palladium component;

from 0 to 0.065 g/in³ of at least one second platinum group metal other than palladium;

from about 0.15 g/in³ to about 2.0 g/in³ of the second support;

from about 0.025 g/in³ to about 0.5 g/in³ of at least one second alkaline earth metal components;

from about 0.025 g/in³ to about 0.5 g/in³ of at least one second rare earth metal component selected from the group consisting of lanthanum metal components and neodymium metal components; and from about 0.025 to about 0.5 g/in³ of the second zirconium component.

20. The layered catalyst composite as recited in claim 1 wherein at least one of the first and second layers further comprises from about 0.025 g/in³ to about 0.5 g/in³ of a nickel component.

21. The layered catalyst composite as recited in claim 19 wherein at least one of the first and second layers further comprises from about 0.1 g/in³ to about 2.0 g/in³ of a particulate composite of zirconia and ceria and optionally further comprising lanthana, neodymia and mixtures thereof.

22. The layered catalyst composite as recited in claim 21 wherein the particulate composite of zirconia and ceria comprises 60 to 90 wt. % zirconia, 10 to 30 wt. % ceria and from 0 to 10 wt % rare earth oxides comprising lanthana, neodymia and mixtures thereof.

23. The layered catalyst composite as recited in claim 1 wherein the composite is in the form of a pellet with the first layer on the inside and the second layer on the outside of the pellet.

24. The layered catalyst composite as recited in claim 1 wherein the first layer is supported on a substrate and the second layer is supported on the first layer opposite the substrate.

25. The layered catalyst composite as recited in claim 24 wherein the substrate comprises a honeycomb carrier.

26. The layered catalyst composite as recited in claim 1 wherein at least one of the first and second layers further comprise a particulate composite of zirconia and rare earth oxide.

27. The layered catalyst composite as recited in claim 26 wherein the rare earth oxide is ceria and, optionally, further comprises lanthana, neodymia and mixtures thereof.

28. The layered catalyst composite as recited in claim 1 wherein the the first layer comprises a bulk first oxygen storage composition and being in intimate contact with the palladium component.

29. The layered catalyst composite as recited in claim 28 wherein the bulk first oxygen storage composition comprises a bulk oxygen storage component selected from the group consisting of bulk ceria and bulk praseodymium.

30. The layered catalyst composition recited in claim 1 wherein the first oxygen storage composition is derived from a water-soluble compound.

31. The layered catalyst composite as recited in claim 1 wherein the first layer comprises at least one first platinum group metal component other than palladium, selected from the group consisting of platinum, rhodium, ruthenium and iridium components.

32. The layered catalyst composite as recited in claim 31 wherein the first platinum group metal component is selected from platinum, rhodium and a mixture of platinum and rhodium components.

33. The layered catalyst composite as recited in claim 31 wherein the second layer comprises at least one second platinum group metal component selected from the group consisting of platinum, rhodium, ruthenium and iridium components.

34. The layered catalyst composite as recited in claim 1 wherein the second layer comprises at least one second platinum group metal component selected from the group consisting of platinum, rhodium, ruthenium and iridium components.

35. The layered catalyst composite as recited in claim 34 wherein the second platinum group metal component is selected from platinum, rhodium and a mixture of platinum and rhodium components.

36. The layered catalyst composite as recited in claim 34 wherein the first layer comprises at least one first platinum group metal component, selected from the group consisting of platinum, rhodium, ruthenium and iridium components.

37. A method of forming a layered catalyst composite comprising the steps of:

forming a first layer comprising:
  a first support;
  a first palladium component;
  optionally at least one first platinum group metal component other than palladium;
  an oxygen storage component in intimate contact with the first platinum group metal component;
  optionally a first zirconium component; optionally at least one first alkaline earth metal components; and
  optionally at least one first rare earth metal component selected from the group consisting of lanthanum metal components and neodymium metal components, wherein the first layer requires at least one first alkaline earth metal component and at least one first rare earth metal component;

coating the first layer with a second layer comprising:
  a second support;
  a second palladium component free from intimate contact with the oxygen storage component;
  optionally at least one second platinum group metal component other than palladium;
  optionally a second zirconium component;
  optionally at least one second alkaline earth metal components; and
  optionally at least one second rare earth metal component selected from the group consisting of lanthanum metal components and neodymium metal components, wherein the second layer requires at least one of the second alkaline earth metal component and at least one second rare earth metal component.

38. The method as recited in claim 37 further comprising the step of adding a nickel component to at least one of said first and second layers.

39. The method as recited in claim 37 further comprising the step of adding a particulate zirconia and ceria composite, optionally further comprising lanthana, neodymia and mixtures thereof to at least one of said first and second layers.

40. The layered catalyst composite as recited in claim 1 wherein there is at least 0.003 g/in³ each of the first and second palladium component.

41. The layered catalyst as recited in claim 31 wherein there is at least 0.003 g/in³ each of the first and second palladium component.

42. The layered catalyst as recited in claim 34 wherein there is at least 0.003 g/in³ each of the first and second palladium component.

43. A layered catalyst composite comprising a first layer and a second layer:

the first layer comprising:
  a first support;
  at least one palladium component, wherein the first palladium component is substantially the only platinum group metal component in the first layer;
  a first oxygen storage component in intimate contact with the first palladium component;
  optionally a first zirconium component;
  optionally at least one first alkaline earth metal component; and
  optionally at least one first rare earth metal component selected from the group consisting of lanthanum metal components and neodymium metal components, wherein the first layer requires at least one first alkaline earth metal component and at least one first rare earth metal component; and the second layer comprising:
  a second support;
  at least one second palladium component free from intimate contact with the oxygen storage component, wherein the second palladium component is substantially the only platinum group metal component in the second layer;
  optionally a second zirconium component;
  optionally at least one second alkaline earth metal component; and
  optionally at least one second rare earth metal component selected from the group consisting of lanthanum metal components and neodymium metal components, wherein the second layer requires at least one of the second alkaline earth metal component and at least one second rare earth metal component.

44. The layered catalyst composite as recited in claim 43 wherein the first layer further comprises:

a first zirconium component;

at least one first alkaline earth metal component; and at least one first rare earth metal component selected from the group consisting of lanthanum metal components and neodymium metal components; and wherein the second layer further comprises:

a second zirconium component;

at least one second alkaline earth metal component; and at least one second rare earth metal component selected from the group consisting of lanthanum metal components and neodymium metal components.

45. The layered catalyst composite as recited in claim 43 wherein the first and second supports are the same or different and are compounds selected from the group consisting of silica, alumina and titania compounds.

46. The layered catalyst composite as recited in claim 45 wherein the first and second supports are the same or different and are activated compounds selected from the group consisting of alumina, silica, silica-alumina, aluminosilicates, alumina-zirconia, alumina-chromia, and alumina-ceria.

47. The layered catalyst composite as recited in claim 46 wherein the first and second supports are activated alumina.

48. The layered catalyst composite as recited in claim 43 wherein the first oxygen storage component is selected from the group consisting of cerium and praseodymium compounds.

49. The layered catalyst composite as recited in claim 48 wherein the first oxygen storage component is ceria.

50. The layered catalyst composite as recited in claim 43 wherein at least one of the first or second layers further comprises a nickel or iron component.

51. The layered catalyst composite as recited in claim 50 wherein the first layer further comprises a nickel or iron component.

52. The layered catalyst composite as recited in claim 43 wherein at least one first alkaline earth metal component and at least one second alkaline earth metal component are derived from a metal selected from the group consisting of magnesium, barium, calcium and strontium.

53. The layered catalyst composite as recited in claim 52 wherein at least one first or second alkaline earth metal component is derived from a metal selected from the group consisting of strontium and barium.

54. The layered catalyst composite as recited in claim 53 wherein the first alkaline earth metal component is barium oxide.

55. The layered catalyst composite as recited in claim 53 wherein the second alkaline earth metal component is strontium oxide.

56. The layered catalyst composite as recited in claim 43 wherein at least one of said first rare earth metal component and second rare earth metal is derived from lanthanum.

57. The layered catalyst composite as recited in claim 56 wherein at least one of said first or second rare earth metal component is derived from neodymium.

58. The layered catalyst composite as recited in claim 57 wherein the second rare earth metal component is derived from neodymium.

59. The layered catalyst composite as recited in claim 43 wherein the composite is in the form of a pellet with the first layer on the inside and the second layer on the outside of the pellet.

60. The layered catalyst composite as recited in claim 43 wherein the first layer is supported on a substrate and the second layer is supported on the first layer opposite the substrate.

61. The layered catalyst composite as recited in claim 60 wherein the substrate comprises a honeycomb carrier.

62. The layered catalyst composite as recited in claim 43 wherein the a first layer further comprises a bulk second oxygen storage composition.

63. The layered catalyst composite as recited in claim 62 wherein the first bulk oxygen storage composition comprises a first oxygen storage component selected from the group consisting of bulk ceria and bulk praseodymium.

64. The layered catalyst composite as recited in claim 43 wherein at least one of the first and second layers further comprise a particulate composite of zirconia and rare earth oxide.

65. The layered catalyst composition recited in claim 43 wherein at least one of the first and second layers further comprises a composite which comprises ceria and zirconia and optionally at least one rare earth component selected from lanthanum and neodymium components.

66. The layered catalyst composite as recited in claim 65 wherein the second layer comprises the particulate composite.

67. The layered catalyst composite as recited in claim 43 wherein there is:

at least 0.003 g/in³ of each of the first and second palladium components;

from about 0.15 to about 2.0 g/in³ of the first support;

at least about 0.05 g/in³ of the first oxygen storage component in intimate contact with the first palladium component;

from about 0.025 to about 0.5 g/in³ of at least one first alkaline earth metal components;

from about 0.025 to about 0.5 g/in³ of the first zirconium component;

from about 0.025 to about 0.5 g/in³ of at least one first rare earth metal component selected from the group consisting of lanthanum metal components and neodymium metal components;

from about 0.15 g/in³ to about 2.0 g/in³ of the second support;

from 0.0 to about 2.0 g/in³ of a second bulk oxygen storage composition;

from about 0.025 g/in³ to about 0.5 g/in³ of at least one second alkaline earth metal components;

from about 0.025 g/in³ to about 0.5 g/in³ of at least one second rare earth metal component selected from the group consisting of lanthanum metal components and neodymium metal components; and from about 0.025 to about 0.5 g/in³ of the second zirconium component.

68. The layered catalyst composite as recited in claim 67 wherein there is respectively from 0 to 0.065 g/in³ of each of the first and second platinum group metal components other than palladium.

69. The layered catalyst composite as recited in claim 67 wherein at least one of the first and second layers further comprises from about 0.025 g/in³ to about 0.5 g/in³ of a nickel component.

70. The layered catalyst composite as recited in claim 67 wherein at least one of the first and second layers further comprises from about 0.1 g/in³ to about 1.0 g/in³ of a particulate composite of zirconia and ceria and optionally further comprising lanthana, neodymia and mixtures thereof.

71. The layered catalyst composite as recited in claim 70 wherein the particulate composite of zirconia and ceria comprises 60 to 90 wt. % zirconia, 10 to 30 wt. % ceria and from 0 to 10 wt. % rare earth oxides comprising lanthana, neodymia and mixtures thereof.

72. A method comprising the steps of:

combining at least one water soluble or dispersible first palladium component and finely divided, high surface area refractory oxide with an aqueous liquid to form a first solution or dispersion which is sufficiently dry to absorb essentially all of the liquid;

mixing the first solution or dispersion with other first layer components comprising a soluble first oxygen storage component to intimately contact the first palladium component;

optionally, mixing the first solution or dispersion with a first water soluble or dispersible platinum group metal component other than a palladium component, a first zirconium component, at least one first alkaline earth metal component, and at least one first rare earth metal component selected from the group consisting of lanthanum metal components and neodymium metal components;

forming a first layer of the first solution or dispersion on a substrate;

converting the first palladium components in the resulting first layer to a water insoluble form;

combining at least one water soluble or dispersible second palladium component and finely divided, high surface area refractory oxide with an aqueous liquid to form a second solution or dispersion which is sufficiently dry to absorb essentially all of the liquid;

optionally, mixing the second solution or dispersion with a second water soluble or dispersible platinum group metal component other than a palladium component, a second zirconium component, at least one second alkaline earth metal component, and at least one second rare earth metal component selected from the group consisting of lanthanum metal components and neodymium metal components;

forming a second layer of the second solution or dispersion on the first layer; and converting the second palladium components in the resulting second layer to a water insoluble form, the second palladium components being free from intimate contact with the oxygen storage component.

73. The method of claim 72 further comprising the steps of forming the first layer on a honeycomb substrate.

74. The method of claim 72 wherein the step of converting the first palladium and platinum group metal components comprises calcining the first layer.

75. The method of claim 72 wherein the step of converting second palladium and platinum group metal components comprises calcining the supported second layer.

76. The method of claim 72 further comprising the steps of:

comminuting the water-insoluble, first palladium component in a first coat slurry, forming a first layer of the first slurry, and drying the first slurry; and comminuting the water-insoluble, second palladium components in a second coat slurry;

forming a second layer of the second slurry on the first layer, and drying the second slurry.

77. The method of claim 76 wherein said comminuting provides a slurry in which most of the solids have particle sizes of less than about 10 microns.

78. The method of claim 77 wherein at least one of said first and second slurry contains acetic acid or nitric acid.

79. The method as recited in claim 72 wherein the first and second-palladium components are palladium nitrate.

80. A catalytic article comprising a upstream section and a downstream section:

the downstream section comprising:
a downstream substrate;
a first layer on the downstream substrate, the layer comprising:
at least one first palladium component;
a first oxygen storage component in intimate contact with the first palladium component;
optionally, a first zirconium component;
optionally, at least one first alkaline earth metal component; and
optionally, at least one first rare earth metal component selected from the group consisting of lanthanum metal components and neodymium metal components; and the upstream section comprising:
an upstream substrate;
a second layer on the upstream substrate, the upstream layer comprising:

at least one second palladium component free from intimate contact with the oxygen storage component;

optionally, a second zirconium component;

optionally, at least one second alkaline earth metal component; and optionally, at least one second rare earth metal component selected from the group consisting of lanthanum metal components and neodymium metal components.

81. The catalytic article as recited in claim 80 wherein the upstream section and downstream section are the upstream section and downstream sections of single substrate.

82. The catalytic article as recited in claim 81 wherein the single substrate is a honeycomb substrate.

83. The catalytic article as recited in claim 80 wherein the upstream section comprises an upstream substrate and the downstream section comprises a downstream substrate separate from the upstream substrate.

84. The catalytic article as recited in claim 83 wherein the upstream substrate and downstream substrate are honeycomb substrates.

* * * * *